(12) United States Patent
Yutaka et al.

(10) Patent No.: US 9,805,096 B2
(45) Date of Patent: Oct. 31, 2017

(54) PROCESSING APPARATUS

(71) Applicant: SONY COMPUTER ENTERTAINMENT INC., Tokyo (JP)

(72) Inventors: Teiji Yutaka, Tokyo (JP); Nobutoshi Koyama, Kanagawa (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 259 days.

(21) Appl. No.: 14/406,956

(22) PCT Filed: Apr. 23, 2013

(86) PCT No.: PCT/JP2013/002753
§ 371 (c)(1),
(2) Date: Dec. 10, 2014

(87) PCT Pub. No.: WO2014/010158
PCT Pub. Date: Jan. 16, 2014

(65) Prior Publication Data
US 2015/0112984 A1    Apr. 23, 2015

(30) Foreign Application Priority Data
Jul. 13, 2012    (JP) ................................ 2012-157738

(51) Int. Cl.
*G06F 17/30* (2006.01)
*G06F 3/0482* (2013.01)

(52) U.S. Cl.
CPC ........ *G06F 17/3053* (2013.01); *G06F 3/0482* (2013.01); *G06F 17/30994* (2013.01)

(58) Field of Classification Search
CPC .................................................. G06F 17/3053
See application file for complete search history.

(56) References Cited

U.S. PATENT DOCUMENTS

2007/0005587 A1\* 1/2007 Johnson .............. G06F 17/3053
2007/0260597 A1\* 11/2007 Cramer ............ G06F 17/30867
(Continued)

FOREIGN PATENT DOCUMENTS

JP    2001-175380    6/2001
JP    2006-253984    9/2006
(Continued)

OTHER PUBLICATIONS

Japanese Notification of Reasons for Refusal dated Jul. 14, 2015 from corresponding Application No. 2012-157738.
(Continued)

*Primary Examiner* — Grace Park
(74) *Attorney, Agent, or Firm* — Katten Muchin Rosenman LLP

(57) ABSTRACT

A ranking unit 320 ranks a plurality of information elements in accordance with a user interest degree derived for each of the information elements. An image data production unit 322 produces image data in which the plurality of information elements are disposed in accordance with the respective ranks with reference to a predetermined position. The image data production unit 322 produces image data in which an information element in which the user interest degree is highest is disposed at the predetermined position while an information element in which the user interest is relatively high is disposed at a position near to the predetermined position and an information element in which the user interest is relatively low is disposed at a position remote from the predetermined position two-dimensionally or three-dimensionally.

12 Claims, 20 Drawing Sheets

(56) References Cited

U.S. PATENT DOCUMENTS

| | | | |
|---|---|---|---|
| 2007/0261001 A1 | 11/2007 | Nagiyama et al. | |
| 2007/0265994 A1* | 11/2007 | Ueda | G06F 17/30011 |
| 2011/0291985 A1 | 12/2011 | Wakako et al. | |
| 2012/0036475 A1 | 2/2012 | Yoshitomi et al. | |
| 2012/0182314 A1 | 7/2012 | Isobe et al. | |
| 2013/0061165 A1* | 3/2013 | Adkins | G06F 17/30905 715/780 |
| 2013/0262124 A1* | 10/2013 | Ponting | G06F 17/30755 704/270.1 |

FOREIGN PATENT DOCUMENTS

| | | |
|---|---|---|
| JP | 2007-073053 | 3/2007 |
| JP | 2007-080109 | 3/2007 |
| JP | 2007-287135 A | 11/2007 |
| JP | 2008-134968 A | 6/2008 |
| JP | 2009-223902 | 10/2009 |
| JP | 2010-055424 | 3/2010 |
| JP | 2010-119714 | 6/2010 |
| JP | 2010-231282 | 10/2010 |
| JP | 2011-028534 | 2/2011 |
| JP | 2011-160304 A | 8/2011 |
| JP | 2012-009009 A | 1/2012 |
| JP | 2012-048204 | 3/2012 |
| JP | 2011-160304 A5 | 9/2012 |
| WO | 02/01411 | 1/2002 |
| WO | 2009/020102 A | 2/2009 |
| WO | 2010/119714 A1 | 10/2010 |
| WO | 2011/021408 A1 | 2/2011 |
| WO | 2012/021627 | 2/2012 |

OTHER PUBLICATIONS

Japanese Notification of Reason for Refusal dated Jan. 12, 2016 from corresponding Application No. 2012-157738.
Japanese Notification of Reason for Refusal dated Jun. 5, 2016 from corresponding Application No. 2012-157738.
Translation of International Preliminary Report on Patentability dated Jan. 15, 2015 from corresponding Application No. PCT/JP2013/002753.
International Search Report dated Jul. 30, 2013, from the corresponding PCT/JP2013/002753.

* cited by examiner

FIG. 2
(a)
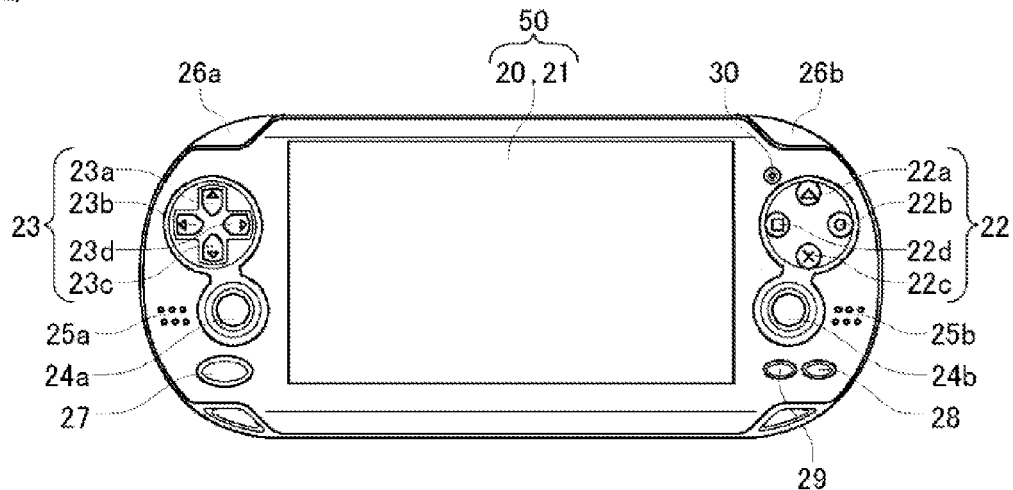
(b)
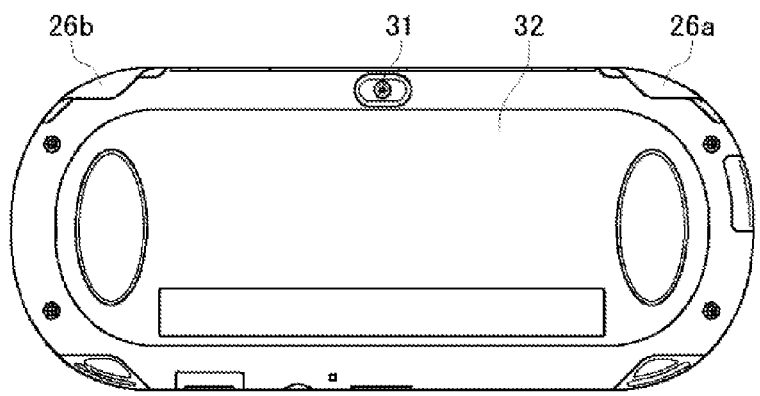

FIG.3
(a) 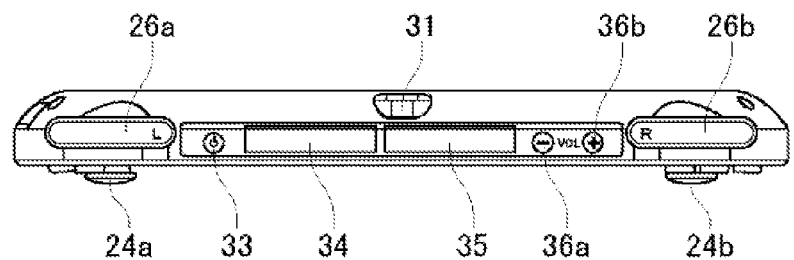
(b) 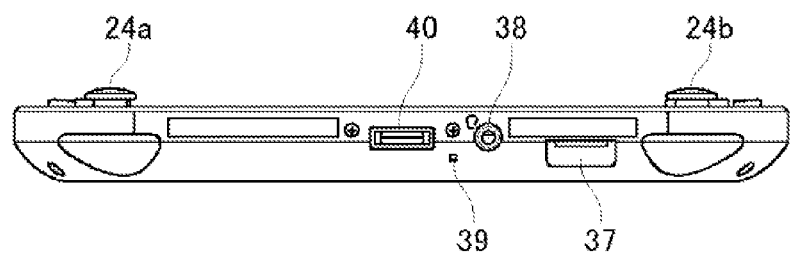
(c) 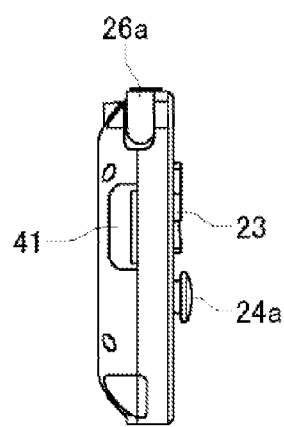

F I G . 5
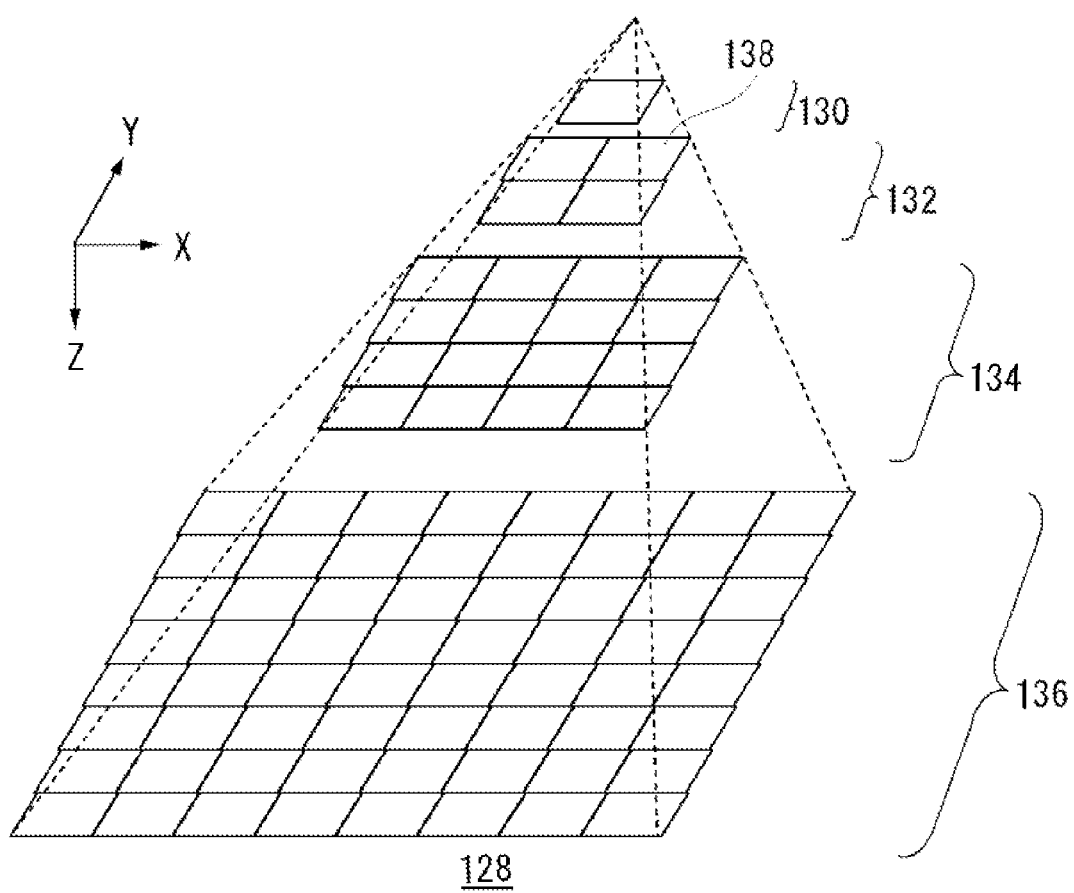

| ITEM | CONTENT ID | ARTIST | ALBUM NAME | GENRE | APPLICATION |
|---|---|---|---|---|---|
| | MUSIC PIECE XYZ | ROCK BAND ABC | DEF | ROCK | — |
| POINT | 3 | 2 | 2 | 0.1 | 0.01 |

FIG.21
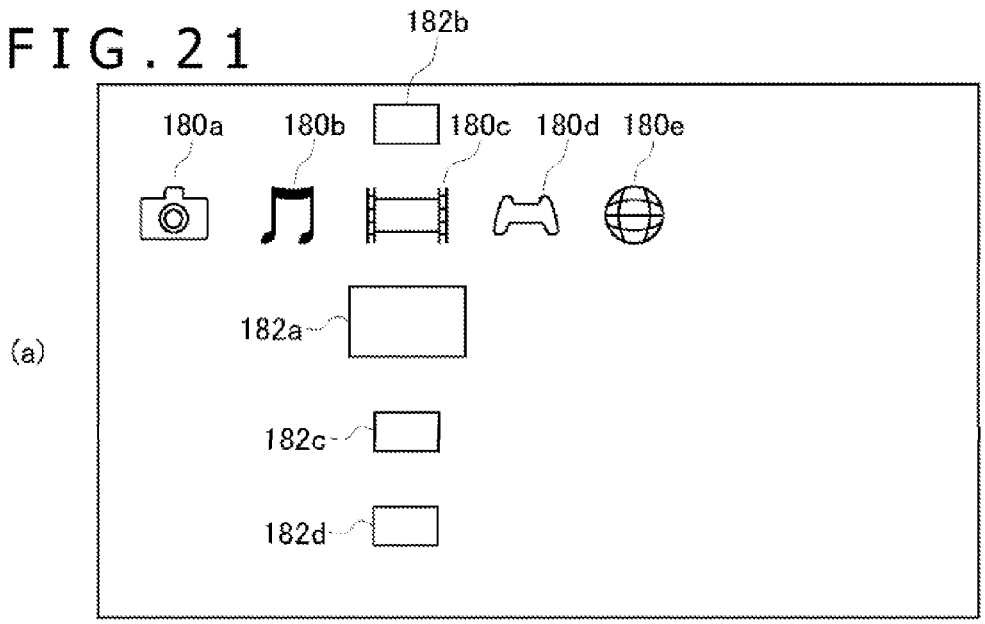
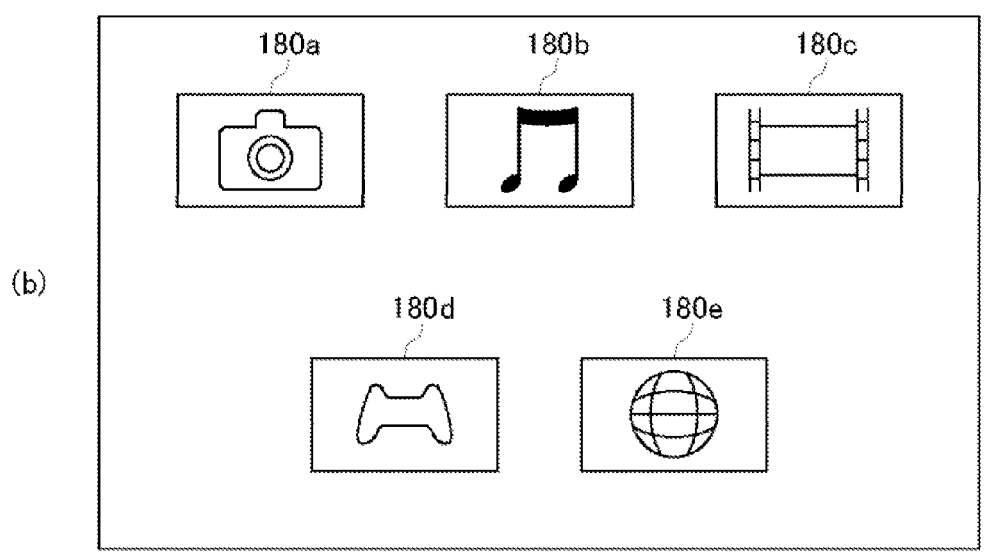

PROCESSING APPARATUS

TECHNICAL FIELD

The present invention relates to a technology for setting a layout of information elements to be displayed for each user.

BACKGROUND ART

Along with increase of the network communication speed or increase in capacity and integration of memory devices in recent years, it has become possible to install many applications into a terminal apparatus and acquire many contents. A smartphone prepares, as a screen image through which an application is to be selected, a plurality of kinds of menu screen images including a standby screen image (home screen image). On each menu screen image, icons of applications are arrayed in the order in which the applications have been installed. A user would change over the menu screen image to search for a desired application icon. If the user selects a photograph reproduction application icon, then a content selection screen image on which a plurality of thumbnail images of different photographs are arrayed in the order in which the photographs have been taken is displayed.

PTL 1 discloses an information processing apparatus which produces a menu screen image on which icons of applications are arrayed on a horizontal axis and icons of contents are arrayed on a vertical axis.

CITATION LIST

Patent Literature

[PTL 1]
US 2011/131115 A1

SUMMARY

Technical Problem

According to a conventional user interface, if new applications are installed or new contents are acquired, then a number of icons equal to the number of new applications or new contents are additionally displayed in a menu screen image. In the user interface of a smartphone, icons are added to a menu screen image (generally called "page") in the order in which the applications or contents have been acquired, and therefore, the page number becomes great. Therefore, there is a problem that it is not easy for a user to search out an application or a content to be executed. Therefore, it is demanded to provide a user interface with which a user can search out an application or a content efficiently.

The present invention has been made in view of such a subject as described above, and it is an object of the present invention to provide a technology for producing image data with which choices of applications or contents can be presented efficiently in response to a user.

Solution to Problem

In order to solve the subject described above, according to a mode of the present invention, a processing apparatus includes a ranking unit configured to rank a plurality of information elements in accordance with a user interest degree derived for each of the information elements, and an image data production unit configured to produce image data in which the plurality of information elements are disposed in accordance with the respective ranks with reference to a predetermined position.

It is to be noted that also an arbitrary combination of the components described above and the representation of the present invention where it is converted between different ones of a method, an apparatus, a system, a computer program and so forth are effective as modes of the present invention.

BRIEF DESCRIPTION OF DRAWINGS

FIG. 2 (a) is a view depicting a front face of an information processing apparatus, and (b) is a view depicting a rear face of the information processing apparatus.

FIG. 3 (a) is a view depicting an upper face of the information processing apparatus, (b) is a view depicting a lower face of the information processing apparatus, and (c) is a view depicting a left side face of the information processing apparatus.

FIG. 5 is a view depicting an example of a hierarchical structure of image data used for production of a menu image.

FIG. 21 (a) and (b) are views each depicting an example of a menu screen image produced using image data of the zeroth hierarchy.

DESCRIPTION OF EMBODIMENT

Figure 1:
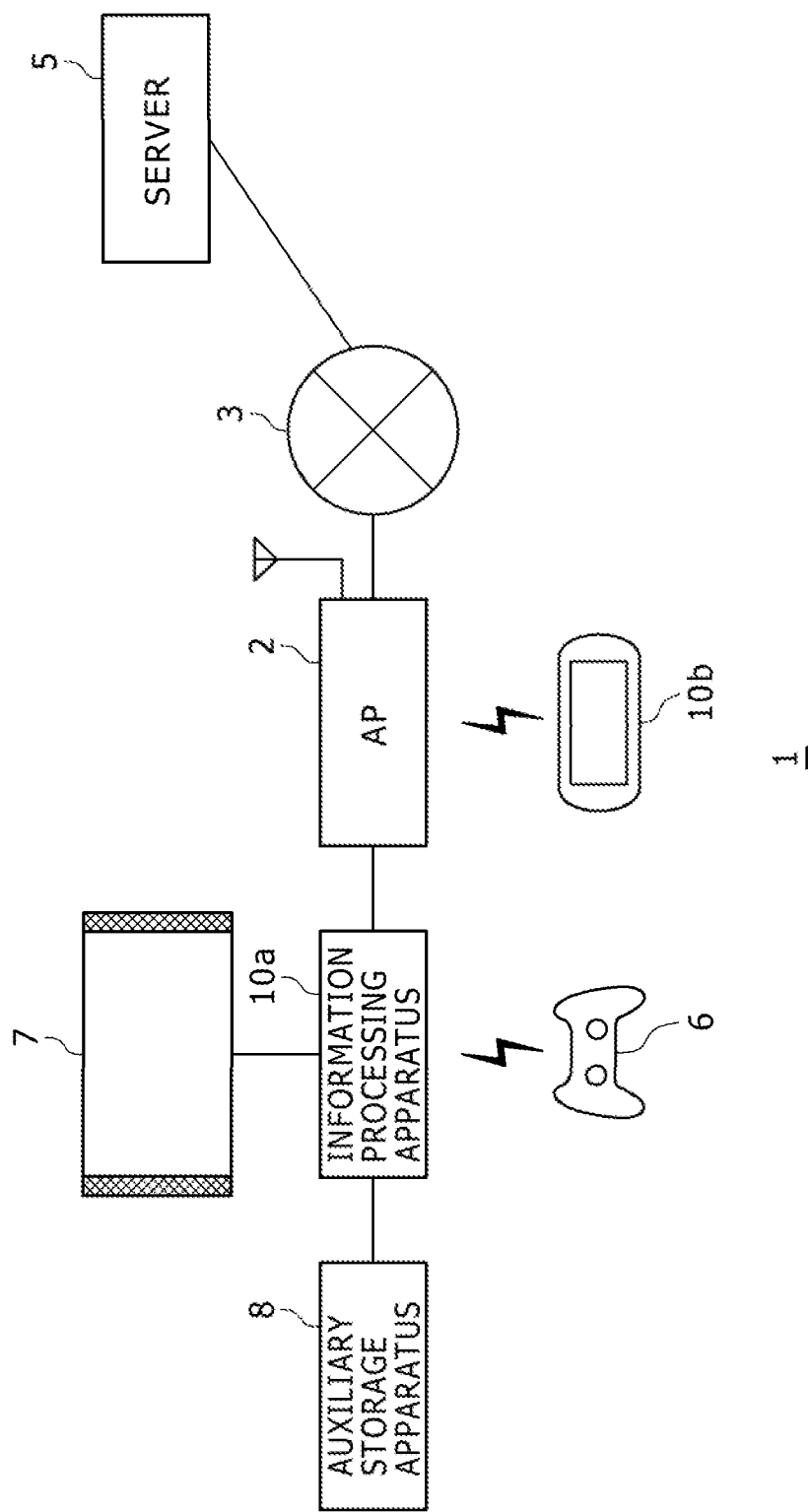
FIG. 1 is a view depicting an information processing system according to an embodiment of the present invention.

FIG. 1 depicts an information processing system 1 according to an embodiment of the present invention. The information processing system 1 includes a stationary information processing apparatus 10a which is a user terminal, a portable information processing apparatus 10b and a server 5. The server 5 may be configured from a plurality of server apparatus. In the present embodiment, each of the information processing apparatuses 10a and 10b and the server 5 functions as a processing apparatus for performing image processing.

An auxiliary storage apparatus 8 is a mass storage apparatus such as an HDD (hard disk drive) or a flash memory, and is coupled to or built in the stationary information processing apparatus 10a. The auxiliary storage apparatus 8 may be an external storage apparatus to be coupled to the information processing apparatus 10a by a USB (Universal Serial Bus) or the like or may be a built-in storage apparatus. An outputting apparatus 7 may be a television set having a display unit for outputting an image and a speaker for outputting sound or a computer display unit. The outputting apparatus 7 may be coupled to the information processing apparatus 10a through a wire cable or may be coupled to the information processing apparatus 10a by wireless connection through a wireless LAN (Local Area Network). The information processing apparatus 10a processes an operation signal from an inputting apparatus 6 which is operated by the user and outputs a result of the processing from the outputting apparatus 7. The information processing apparatus 10a may be a game apparatus, and, in this case, the inputting apparatus 6 is a game controller.

The portable information processing apparatus 10b has a wireless communication function and is coupled by wireless connection to an access point (hereinafter referred to as "AP") 2. The portable information processing apparatus 10b has a communication function by a wireless LAN system and coupled by wireless connection to the AP 2 in an infrastructure mode. The information processing apparatus 10b may be a game apparatus. The AP 2 has functions as a wireless access point and a rooter, and the information processing apparatuses 10a and 10b are coupled to the AP 2 by wire or wireless connection and are coupled to the server 5 on a network 3 such as the Internet.

The server 5 has an account ID (hereinafter referred to as "user account") of a user who uses the information processing system 1. In the present embodiment, one user A retains at least one of the stationary information processing apparatus 10a and the portable information processing apparatus 10b, and the information processing apparatuses 10a and 10b can communicate with the server 5 using the user account which specifies the user A.

The server 5 acquires and records behavior (activity) information of the user A to a content and an application from the information processing apparatus 10a and/or the information processing apparatus 10b coupled using the account of the user A. The server 5 analyzes in what the user is interested based on the recorded activity information. Then, based on a result of the analysis, the server 5 produces, in response to a request from the user A, menu image data in which information elements in which the interest of the user A is high are arrayed at a position at which the information elements can be easily viewed (easily selected) by the user A, and transmits the produced menu image data. Consequently, the user A can display a menu screen image with which the user A can easily access the information elements in which the interest of the user A is high on a display unit.

It is to be noted that, while, in the information processing system 1, a plurality of users access the server 5 using the information processing apparatuses 10a and 10b, the server 5 records activity information of the users in an associated relationship with the user accounts of the users and extracts information elements in which the interest of the user is high and then provides menu image data in which the information elements are arrayed at a position at which the user can easily view (easily select) the information elements. It is to be noted that, while, in the present embodiment, the information processing apparatus 10a is a stationary game apparatus and the information processing apparatus 10b is a portable game apparatus, some other information processing apparatus such as, for example, a personal computer, a portable telephone set, a smartphone or a PDA (Personal Digital Assistant) may be used as the information processing apparatus 10a or 10b. In the present specification, the apparatuses described are generally referred to as information processing apparatus 10. Further, while, in the information processing system 1, two information processing apparatuses 10 including the information processing apparatuses 10a and 10b are indicated, each user may have one information processing apparatus 10. The portable information processing apparatus 10b is described below as a representative of the information processing apparatus 10.

[Configuration of the Front Face Portion]

FIG. 2(*a*) depicts a front face of the information processing apparatus 10. The information processing apparatus 10 is formed from a horizontally elongated housing, and left and right regions to be grasped by the user have an arcuate outer hull. A rectangular touch panel 50 is provided on the front face of the information processing apparatus 10. The touch panel 50 is configured from a display apparatus 20 and a transparent front touchpad 21 which covers the surface of the display apparatus 20. The display apparatus 20 is an organic EL (Electro-Liminescence) panel and displays an image thereon. It is to be noted that the display apparatus 20 may be display means such as a liquid crystal panel. The front touchpad 21 is a multi-touchpad having a detection function for detecting a plurality of points touched at the same time, and the touch panel 50 is configured as a multi-touch screen.

At the right side of the touch panel 50, a triangular mark button 22a, a round mark button 22b, a cross mark button 22c and a square mark button 22d (hereinafter referred to generally as "an operation button 22") each positioned at the top of a rhomboid are provided. At the left side of the touch panel 50, an upward key 23a, a leftward key 23b, a downward key 23c and a rightward key 23d (hereinafter referred to generally as "a direction key 23") are provided. The user can operate the direction key 23 to input eight directions including upward, downward, leftward and rightward directions and four oblique directions. A left stick 24a is provided at the lower side of the direction keys 23, and a right stick 24b is provided at the lower side of the operation buttons 22. The user would tilt the left stick 24a or the right stick 24b (hereinafter referred to generally as "an analog stick 24") to input a direction and a tilt amount. An L button 26a and an R button 26b are provided at the left and right top portions of the housing, respectively. The operation button 22, direction key 23, analog stick 24, L button 26a and R button 26b configure operation means for being operated by the user.

A front camera 30 is provided in the proximity of the operation button 22. A left speaker 25a and a right speaker 25b (hereinafter referred to generally as "a speaker 25") for outputting sound are provided at the left side of the left stick 24a and the right side of the right stick 24b, respectively. Further, a HOME button 27 is provided at the lower side of the left stick 24*a* and a START button 28 and a SELECT button 29 are provided at the lower side of the right stick 24*b*.

[Configuration of the Rear Face Portion]

FIG. 2(*b*) depicts the rear face of the information processing apparatus 10. On the rear face of the information processing apparatus 10, a rear camera 31 and a rear touchpad 32 are provided. The rear touchpad 32 is configured as a multi-touchpad similarly to the front touchpad 21. The information processing apparatus 10 includes two cameras and two touchpads on the front face and rear face thereof.

[Configuration of the Upper Face Portion]

FIG. 3(*a*) depicts an upper face of the information processing apparatus 10. As described above, at the left and right end sides on the upper face of the information processing apparatus 10, the L button 26*a* and the R button 26*b* are provided, respectively. A power supply button 33 is provided at the right side of the L button 26*a*, and the user would depress the power supply button 33 for a predetermined time period (for example, two seconds) or more to switch on or off the power supply. It is to be noted that the information processing apparatus 10 has a power controlling function by which, if the period of time (non-operation time period) within which the operation means is not operated continues for a predetermined period of time, then the information processing apparatus 10 enters a suspended state. If the information processing apparatus 10 enters the suspended state, then if the user depresses the power supply button 33 for a short period of time (for example, for two seconds), then the information processing apparatus 10 can restore an awake state from the suspended state.

A game card slot 34 is an insertion hole into which a game card is to be inserted, and in FIG. 3(*a*), a state is illustrated in which the game card slot 34 is covered with a slot cover. It is to be noted that, in the proximity of the game card slot 34, an LED lamp that blinks when a game card is accessed may be provided. An accessory terminal 35 is a terminal for connecting a peripheral apparatus (accessory) therethrough, and in FIG. 3(*a*), a state is illustrated in which the accessory terminal 35 is covered with a terminal cover. Between the accessory terminal 35 and the R button 26*b*, a negative mark button 36*a* and a positive mark button 36*b* for adjusting the volume are provided.

[Configuration of the Lower Face Portion]

FIG. 3(*b*) depicts a lower face of the information processing apparatus 10. A memory card slot 37 is an insertion hole into which a memory card is to be inserted, and in FIG. 3(*b*), a state is illustrated in which the memory card slot 37 is covered with a slot cover. On the lower face of the information processing apparatus 10, a sound inputting/outputting terminal 38, a microphone 39 and a multi-use terminal 40 are provided. The multi-use terminal 40 is compatible with the USB (Universal Serial Bus) and can be coupled to some other apparatus through a USB cable.

[Configuration of the Left Side Face Portion]

FIG. 3(*c*) depicts a left side face of the information processing apparatus 10. On the left side face of the information processing apparatus 10, a SIM card slot 41 that is an insertion hole for a SIM card is provided.

[Circuit Configuration of the Information Processing Apparatus]

Figure 4:
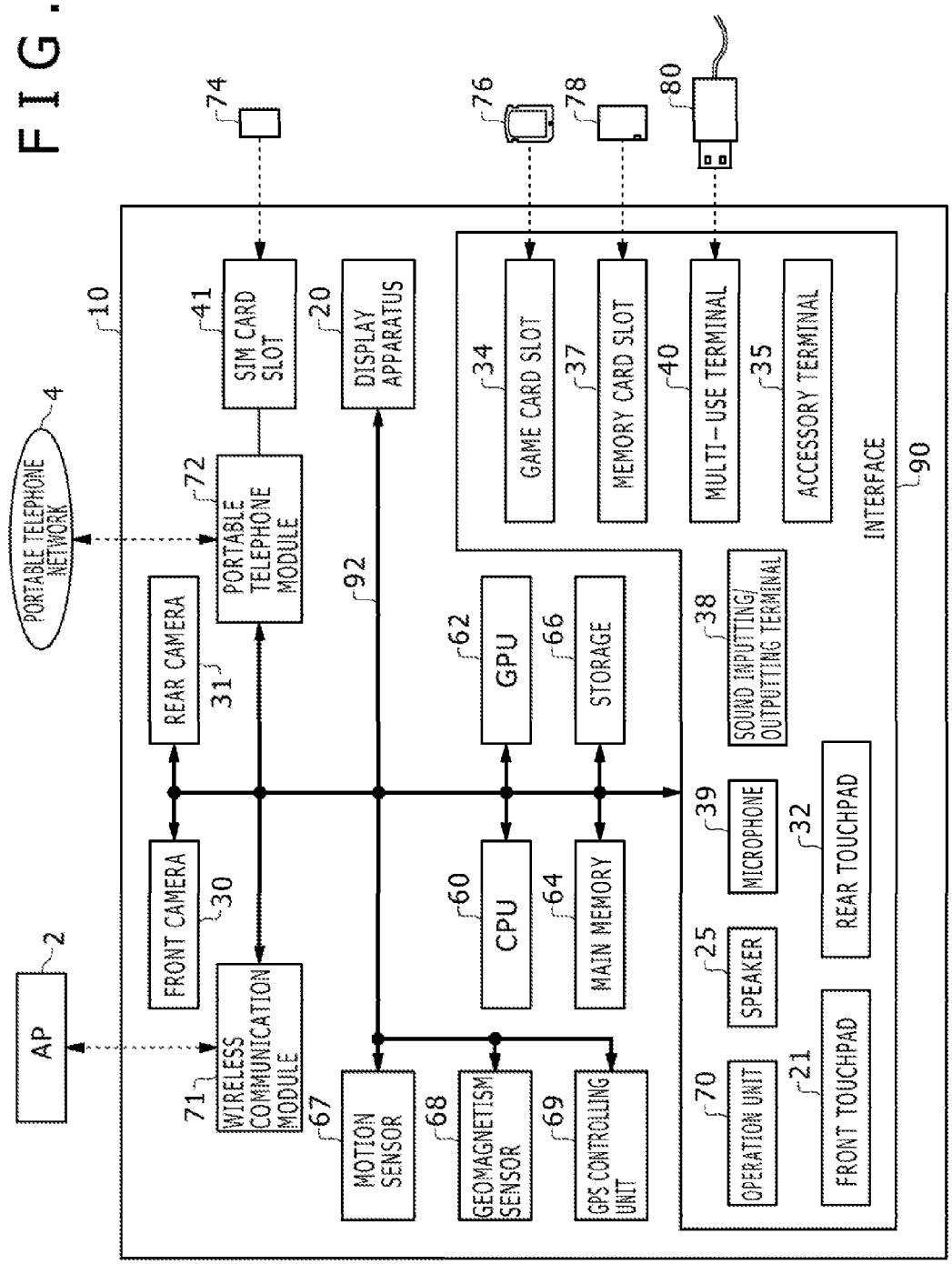
FIG. 4 is a view depicting a circuit configuration of the information processing apparatus.

FIG. 4 depicts a circuit configuration of the information processing apparatus 10. The components are coupled to each other by a bus 92. A wireless communication module 71 is configured from a wireless LAN module compliant with a communication standard such as IEEE802.11b/g and is used for coupling to an external network through the AP 2. It is to be noted that the wireless communication module 71 may have a communication function of the Bluetooth (registered trademark) protocol. A portable telephone module 72 is ready for a third generation (3rd Generation) digital portable telephone system compliant with the IMT-2000 (International Mobile Telecommunication 2000) standard prescribed by the ITU (International Telecommunication Union) and is used for coupling to a portable telephone network 4. Into the SIM card slot 41, a SIM card 74 on which a unique ID number for specifying a telephone number of a portable telephone set is recorded is inserted. If the SIM card 74 is inserted into the SIM card slot 41, then the portable telephone module 72 is enabled for communication with the portable telephone network 4.

A CPU (Central Processing Unit) 60 executes a program or the like loaded in a main memory 64. A GPU (Graphics Processing Unit) 62 executes calculation necessary for image processing. The main memory 64 is configured from a RAM (Random Access Memory) or the like, and stores a program, data and so forth to be used by the CPU 60. A storage 66 is configured from a NAND type flash memory (NAND-type flash memory) or the like and is utilized as a built-in auxiliary storage apparatus.

A motion sensor 67 detects an activity of the information processing apparatus 10, and a geomagnetism sensor 68 detects geomagnetism in three-axis directions. A GPS controlling unit 69 receives signals from GPS satellites and calculates a current position. The front camera 30 and the rear camera 31 pick up an image and input image data. The front camera 30 and the rear camera 31 are individually configured from a CMOS image sensor (Complementary Metal Oxide Semiconductor Image Sensor).

The display apparatus 20 is an organic EL display apparatus and has light emitting elements which emit light when a voltage is applied between a cathode and an anode. In a power saving mode, the voltage to be applied between the electrodes is set lower than a normal voltage so that the display apparatus 20 can be placed into a dimmed state, and the power consumption can be suppressed. It is to be noted that the display apparatus 20 may be a liquid crystal panel display apparatus including a backlight. In the power saving mode, the light amount of the backlight is lowered so that the liquid crystal panel display apparatus is placed into a dimmed state, and the power consumption can be suppressed.

In an interface 90, an operation unit 70 includes the various operation means in the information processing apparatus 10. In particular, the operation unit 70 includes the operation button 22, direction key 23, analog stick 24, L button 26*a*, R button 26*b*, HOME button 27, START button 28, SELECT button 29, power supply button 33, negative mark button 36*a* and positive mark button 36*b*. The front touchpad 21 and rear touchpad 32 are multi-touchpads, and the front touchpad 21 is disposed in an overlapping relationship with the surface of the display apparatus 20. The speaker 25 outputs sound produced by the functions of the information processing apparatus 10, and the microphone 39 inputs sound around the information processing apparatus 10. The sound inputting/outputting terminal 38 inputs stereo sound from external microphones and outputs stereo sound to an external headphone or the like.

Into the game card slot 34, a game card 76 in which a game file is recorded is inserted. The game card 76 has a recording region into which data can be written, and if the game card 76 is loaded into the game card slot 34, then writing/reading of data is performed by a medium drive. Into the memory card slot 37, a memory card 78 is inserted. If the memory card 78 is loaded into the memory card slot 37, then the memory card 78 is utilized as an external auxiliary storage apparatus. The multi-use terminal 40 can be utilized as a USB terminal, and a USB cable 80 is coupled to the multi-use terminal 40 such that transmission and reception of data to and from some other USB apparatus are carried out. A peripheral apparatus is coupled to the accessory terminal 35.

<Example of the Image Processing Function of the Information Processing Apparatus 10>

In the information processing system 1, the information processing apparatus 10 has a function for smoothly executing image processing such as enlargement, reduction and scrolling of a display image or the like. The information processing apparatus 10 may implement the image processing function by loading a program for image processing. The information processing apparatus 10 performs processes for changing a display image such as an enlargement/reduction process of a display image to be displayed on the display apparatus 20 or a moving process of the display image in any of upward, downward, leftward, rightward directions in response to operation information inputted from the operation unit 70 by the user.

The server 5 produces image data for configuring a menu screen image customized for each user utilizing activity information of the user. In this example, the server 5 produces the hierarchical image data represented by a plurality of tile images having different resolutions in order to allow enlargement/reduction of the display image to be performed in the information processing apparatus 10 with a high definition. The server 5 provides tile images necessary for production of a display image in the information processing apparatus 10 to the information processing apparatus 10 in response to a request from the information processing apparatus 10.

The information processing apparatus 10 is coupled to the network 3 and suitably downloads and acquires tile images necessary for production of a display image from the server 5 in response to operation information inputted from the operation unit 70. It is to be noted that the information processing apparatus 10 may download and acquire the entire hierarchical compression image data from the server 5.

The information processing apparatus 10 of the present embodiment carries out an enlargement/reduction process of a display image or a moving process in the upward, downward, leftward or rightward direction in response to an instruction from the user. In the present embodiment, the display image is a menu image on which "information elements" relating to an application or a content are effectively arrayed in order to make it possible for the user to access an application, a content or the like. The "information elements" are elements for specifying an application, a content, meta information of the application or content or the like, and, in the menu screen image, information (label) indicative of the substance of the information elements is displayed. In the present embodiment, also a displayed article displayed in the menu screen image is referred to as "information element." In particular, the information elements that are display articles represent, for example, a name of an application or a content, meta information relating to an application or a content in a text or an image such as an icon. In the menu screen image, information elements in which the interest of the user is high are disposed at a position at which the information elements can be viewed easily by the user.

In the information processing apparatus 10, a function for inputting an enlargement/reduction instruction of a display image and a scrolling instruction in the upward, downward, leftward or rightward direction is allocated to the operation unit 70. For example, the inputting function of an enlargement/reduction instruction of a display image is allocated to the right side analog stick 24*b*. The user can input a reduction instruction of a display image by pulling the analog stick 24*b* to the near side to the user, and the user can input an enlargement instruction of a display image by pushing the analog stick 24*b* from the near side. The inputting function of a scrolling instruction of a display image is allocated to the left side analog stick 24*a*. The user can input a scrolling instruction of a display image by tilting the analog stick 24*a* in the forward, rearward, leftward or rightward direction. In the present embodiment, the enlargement instruction and the reduction instruction and the scrolling instruction of a display image are generally referred to as image changing instructions.

FIG. 5 depicts an example of a hierarchical structure of image data used for production of a menu image. The image data is produced for each user in accordance with activity information of the user in the server 5, and the server 5 suitably provides tile images necessary for production of a display image to the information processing apparatus 10. It is to be noted that the server 5 may issue a notification of structure data indicative of the hierarchical structure of the image data to the information processing apparatus 10, and the information processing apparatus 10 may derive space coordinates for specifying a frame image (display image) from operation information of the operation unit 70 using this structure data.

The image data has a hierarchical structure including a zeroth hierarchy 130, a first hierarchy 132, a second hierarchy 134 and a third hierarchy 136 in the depthwise (Z-axis) direction, and the image data having the hierarchical structure is hereinafter referred to as "hierarchical data." It is to be noted that, while the hierarchical structure may have a higher hierarchy or hierarchies such as a fourth hierarchy or the number of hierarchies may be three or less, it includes at least two hierarchies. A hierarchical data 128 depicted in FIG. 5 has a quadtree hierarchical structure, and each of the hierarchies is configured from one or more tile images 138. All of the tile images 138 are formed so as to have an equal size having an equal number of pixels and individually have, for example, 256×256 pixels. In the image data of the hierarchies, entire images in the hierarchies are represented by resolutions different from each other. The resolution of the Nth hierarchy (N is an integer equal to or higher than 0) may be ½ of a resolution of the (N+1)th hierarchy in both of the leftward and rightward (X-axis) direction and the upward and downward (Y-axis) direction.

The entire images represented by the hierarchies may be different from each other. For example, the entire image represented by image data of the zeroth hierarchy 130 and the entire images represented by image data of the first hierarchy 132 to the third hierarchy 136 may be images having compositions different from each other. It is to be noted that, in the present embodiment, the entire images of the first hierarchy 132 to the third hierarchy 136 represent a menu image having a layout in which a plurality of information elements are disposed in response to activity records of a user, and the entire image of the zeroth hierarchy 130 represents a menu image common to all users.

In the hierarchical data structure depicted in FIG. 5, a position in the depthwise (Z-axis) direction indicates a resolution, and the resolution decreases toward a position near to the zeroth hierarchy 130 and increases toward a position near to the third hierarchy 136. If attention is paid to the size of an image displayed on a display unit, the position in the depthwise direction corresponds to the scale size. Where it is assumed that the scale factor is 1 with reference to the display image of the third hierarchy 136, the scale factor in the second hierarchy 134 is 1/4; the scale factor in the first hierarchy 132 is 1/16; and the scale factor in the zeroth hierarchy 130 is 1/64. Accordingly, where the display image varies in a direction from the zeroth hierarchy 130 side to the third hierarchy 136 side in the depthwise direction, the display image increases in size, and, where the display image varies in a direction from the third hierarchy 36 side to the zeroth hierarchy 30 side, the display image decreases in size.

The hierarchical structure of the hierarchical data 128 is set such that the X axis is defined by the leftward and rightward direction; the Y axis is defined by the upward and downward direction; and the Z axis is defined by the depthwise direction as depicted in FIG. 5, and a virtual three-dimensional space is constructed. In this hierarchical structure, the X axis and the Y axis define a common coordinate system having a common origin. The information processing apparatus 10 derives a changing amount of a display image from an image changing instruction supplied thereto from the operation unit 70 and uses the derived changing amount to derive information for specifying a hierarchy and texture coordinates (UV coordinates) in the hierarchy. A combination of the hierarchy specification information and the texture coordinates is referred to as space coordinates. The space coordinates in the virtual space are utilized for a specification process of tile images to be used and a production process for a display image. It is to be noted that the information processing apparatus 10 may otherwise derive coordinates of the four corners of a frame image in the virtual space using the changing amount of the display image. Also the frame coordinates of the four corners are referred to as space coordinates. Further, the information processing apparatus 10 may derive center coordinates (X, Y) of a frame image in the virtual space and a scale factor SCALE as the space coordinates. Only it is necessary for the information processing apparatus 10 to be able to specify a usage region of tile images 138 of an appropriate hierarchy from an image changing instruction signal supplied thereto from the operation unit 70, and any technique may be adopted.

When the information processing apparatus 10 is to suitably download and acquire tile images necessary for production of a display image from the server 5, the information processing apparatus 10 transmits derived space coordinates to the server 5, and the server 5 provides tile images specified based on the space coordinates to the information processing apparatus 10. It is to be noted that the server 5 may specify tile images, which may be, for example, necessitated in the future, by prediction and provide the tile images to the information processing apparatus 10 in advance. It is to be noted that this prediction may be made by the information processing apparatus 10, and the server 5 may be requested to provide the tile images. Where the information processing apparatus 10 has downloaded all hierarchical data 128 from the server 5, the information processing apparatus 10 may specify a usage region of the tile images 138 from the derived space coordinates.

Figure 6:
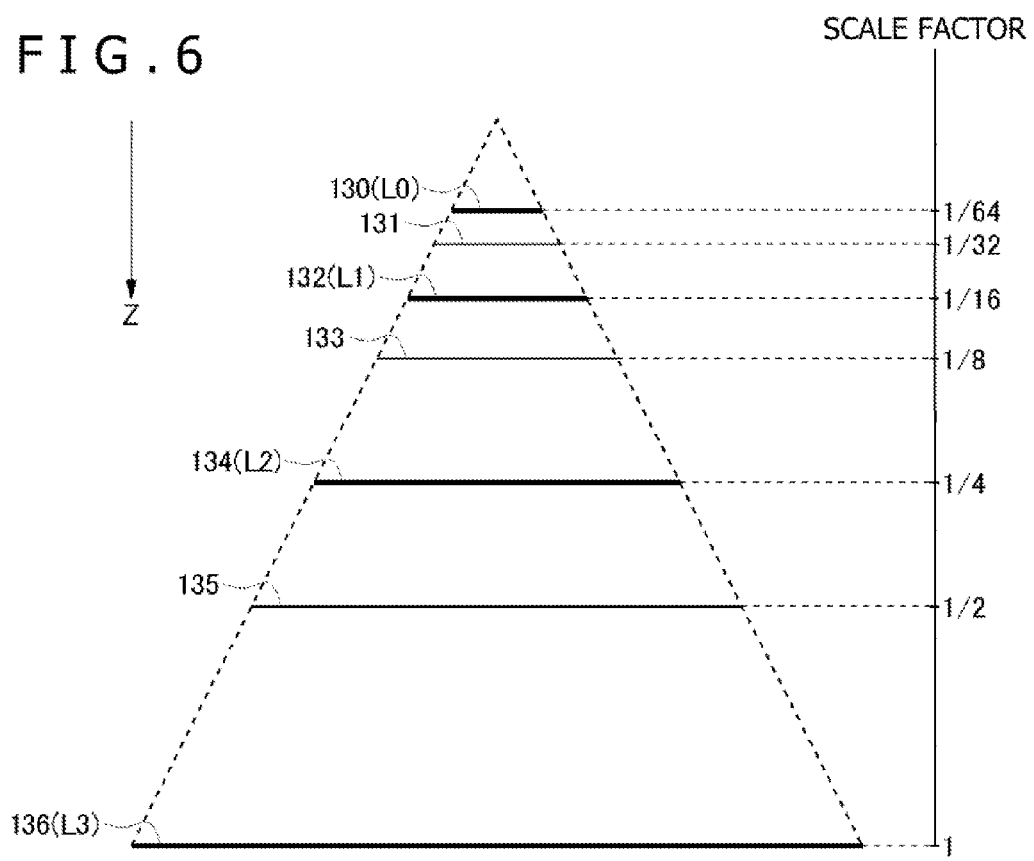
FIG. 6 is an explanatory view illustrating a relationship of scale factors.

FIG. 6 is an explanatory view illustrating a relationship of scale factors. In this hierarchical data structure, the hierarchies are represented as L0 (zeroth hierarchy 130), L1 (first hierarchy 132), L2 (second hierarchy 134) and L3 (third hierarchy 136). In the hierarchical data structure depicted in FIG. 6, a position in the depthwise (Z-axis) direction indicates a resolution, and the resolution decreases toward a position near to L0 and increases toward a position near to L3. If attention is paid to the size of an image displayed on the display unit, then a position in the depthwise direction corresponds to a scale factor, and if the scale factor of a display image of L3 is represented by 1, then the scale factor of L2 is 1/4; the scale factor of L1 is 1/16; and the scale factor of L0 is 1/64.

The scale factors of a first boundary 131, a second boundary 133 and a third boundary 135 are defined with reference to L3 and utilized as criteria for determining a hierarchy of tile images to be used for production of a display image. The scale factor at the first boundary 131 is set to 1/32, and if the required scale factor of the display image is lower than 1/32, then the L0 tile image is used for production of a display image. If the scale factor at the second boundary 133 is set to 1/8, and the required scale factor for the display image is equal to or higher than 1/32 but lower than 1/8, then the L1 tile images are used for production of a display image. Similarly, if the scale factor at the third boundary 135 is set to 1/2 and the required scale factor for the display image is equal to or higher than 1/8 but lower than 1/2, then the L2 tile images are used. Further, if the required scale factor of the display image is equal to or higher than 1/2, then the L3 tile images are utilized. Accordingly, if the required scale factor for an image to be displayed after this is determined, then the information processing apparatus 10 acquires tile images of a resolution corresponding to the scale factor from the server 5 and can produce a display image adjusted so as to have the scale factor. It is to be noted that the scale factor may be represented by a Z coordinate in the depthwise direction in the virtual three-dimensional space depicted in FIG. 5. The Z coordinate in this case can be used as information relating to the scale factor in the information processing apparatus 10. It is to be noted that the scale factor may be similarly represented by a resolution in the virtual three-dimensional space, and also the resolution in this case can be handled as information relating to the scale factor in the information processing apparatus 10.

Figure 7:
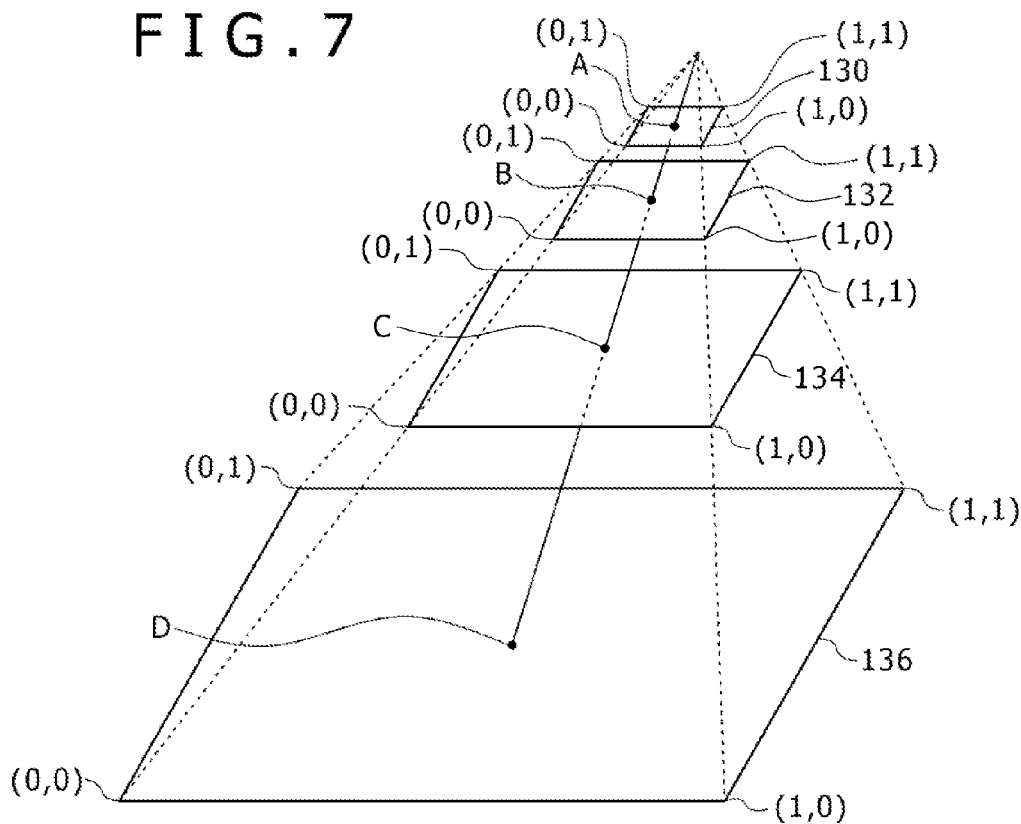
FIG. 7 is an explanatory view illustrating a coordinate system for hierarchical data.

FIG. 7 is an explanatory view illustrating a coordinate system for hierarchical data. Image data in the hierarchies is represented by a common coordinate system in which the origins of the X axis and the Y axis are same. If attention is paid to one point (x, y) on the XY plane, then in the virtual three-dimensional space of the hierarchical data, space coordinates are represented by (x, y, SCALE). In particular, the coordinates of a point A on the zeroth hierarchy 130 are represented as (x, y, 1/64); the coordinates of a point B on the first hierarchy 132 by (x, y, 1/16); the coordinates of a point C on the second hierarchy 134 by (x, y, 1/4); and the coordinates of a point D on the third hierarchy 136 by (x, y, 1). The information processing apparatus 10 derives space coordinates in the coordinate system in accordance with an image changing instruction supplied thereto from the operation unit 70 and transmits the derived space coordinates to the server 5. It is to be noted that, although image processing which uses such hierarchical data as described above exhibits a superior advantage in enlargement/reduction of a display image, in the present embodiment, some other image processing technique may be adopted.

<Mechanism for Calculating a User Interest Degree>

In the present embodiment, a menu screen image on which information elements in which a user has a high degree of interest are disposed in a region in which the user can view or select the information elements readily. Thus, in the following, a mechanism for calculating a degree of interest of a user is described as a premise for producing a menu screen image.

In the information processing system 1, the server 5 calculates a degree of interest in an information element which represents an application, a content, meta information of an application or a content or the like based on user activity information provided from the information processing apparatus 10. The user interest degree may be calculated as an accumulated value of points or, when the user interest degree is calculated as an accumulated value, points by user activity information within a fixed period may be accumulated. The period may be, for example, approximately six months.

An information element is not limited to information which specifies an application or a content itself but may include content meta information such as an author, a performer or the like of the content and is set in the server 5 from various perspectives. The information processing apparatus 10 has various applications or contents and can provide a user interface by which a user can easily reach an application or a content in which the user has a high interest. For example, where a user A reproduces a "music piece XYZ" at a high frequency on the information processing apparatus 10, it is predicted not only that the user has a high interest in the "music piece XYZ" but also that the user has a high interest also in a musician who plays the "music piece XYZ" (here, the musician is "rock band ABC"). Further, if the user always reproduces the music on a "music player AA" while the information processing apparatus 10 includes a plurality of music players (applications), then also it is predicted that the "music player AA" is favorite to the user A.

If the user A reproduces the music piece XYZ in this manner, then the server 5 adds points of this user activity to various information elements. Thus, one user activity can be reflected on various degrees of interest. From this reason, the server 5 defines not only the "music piece XYZ" which is a content itself but also content meta information such as the "music player AA" or the "rock band ABC" as information elements.

Accordingly, if the user A reproduces the music piece XYZ of the rock band ABC on the music player AA, then this activity of the user A increases points of the "rock band ABC," "music piece XYZ" and "music player" which individually are information elements. The server 5 manages the meta information of the content, and if the server 5 is notified that the music piece XYZ is reproduced on the music player AA from the information processing apparatus 10, then the server 5 increments not only the point number of the information element brought thereto but also the point number of an information element included in the meta information (here, the "rock band ABC"). It is to be noted that the server 5 may otherwise manage only meta information which can make an information element with regard to a content.

Figure 8:
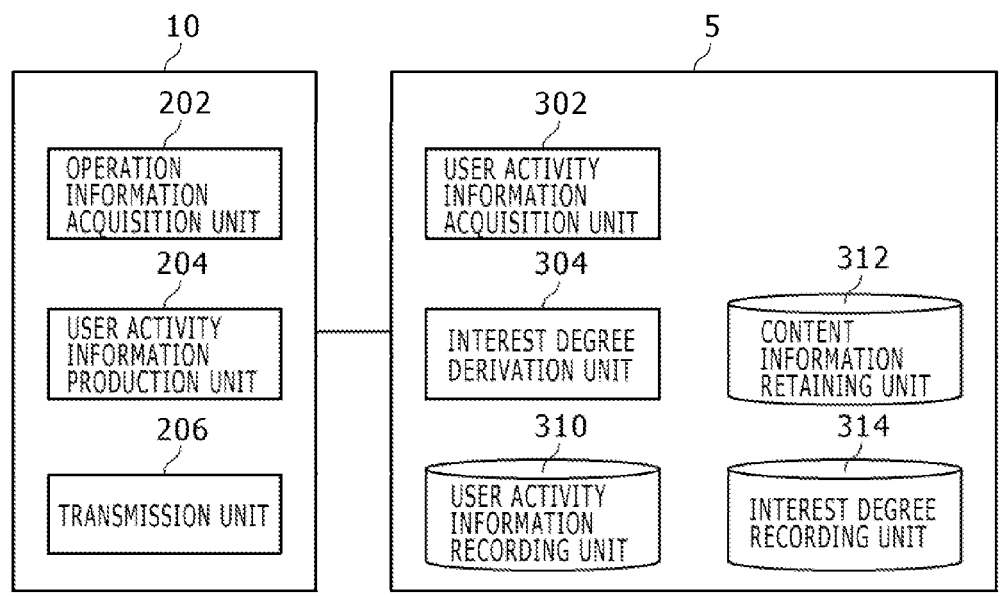
FIG. 8 is a view depicting functional blocks for carrying out interest degree calculation in the information processing system.

FIG. 8 depicts functional blocks for calculating a degree of interest in the information processing system 1. The information processing apparatus 10 includes an operation information acquisition unit 202, a user activity information production unit 204 and a transmission unit 206. The server 5 includes a user activity information acquisition unit 302, an interest degree derivation unit 304, a user activity information recording unit 310, a content information retaining unit 312 and an interest degree recording unit 314.

Referring to FIG. 8, the components described as the functional blocks which carry out various processes can be configured, in hardware, from a CPU (Central Processing Unit), a memory and other LSIs and can be implemented, in software, from a program loaded in the memory and so forth. Accordingly, it can be recognized by those skilled in the art that the functional blocks can be implemented in various forms such as a form only of hardware, a form only of software or a combination of hardware and software and the functional blocks are not limited to any of the forms.

In the information processing apparatus 10, the operation information acquisition unit 202 acquires operation information of a user from the operation unit 70. The user activity information production unit 204 produces information representative of a user activity based on the operation information acquired by the operation information acquisition unit 202. In the following, a production technique of user activity information in a case in which the user A causes a newspaper article to be displayed on the display apparatus 20 and views a newspaper article is described.

Figure 9:
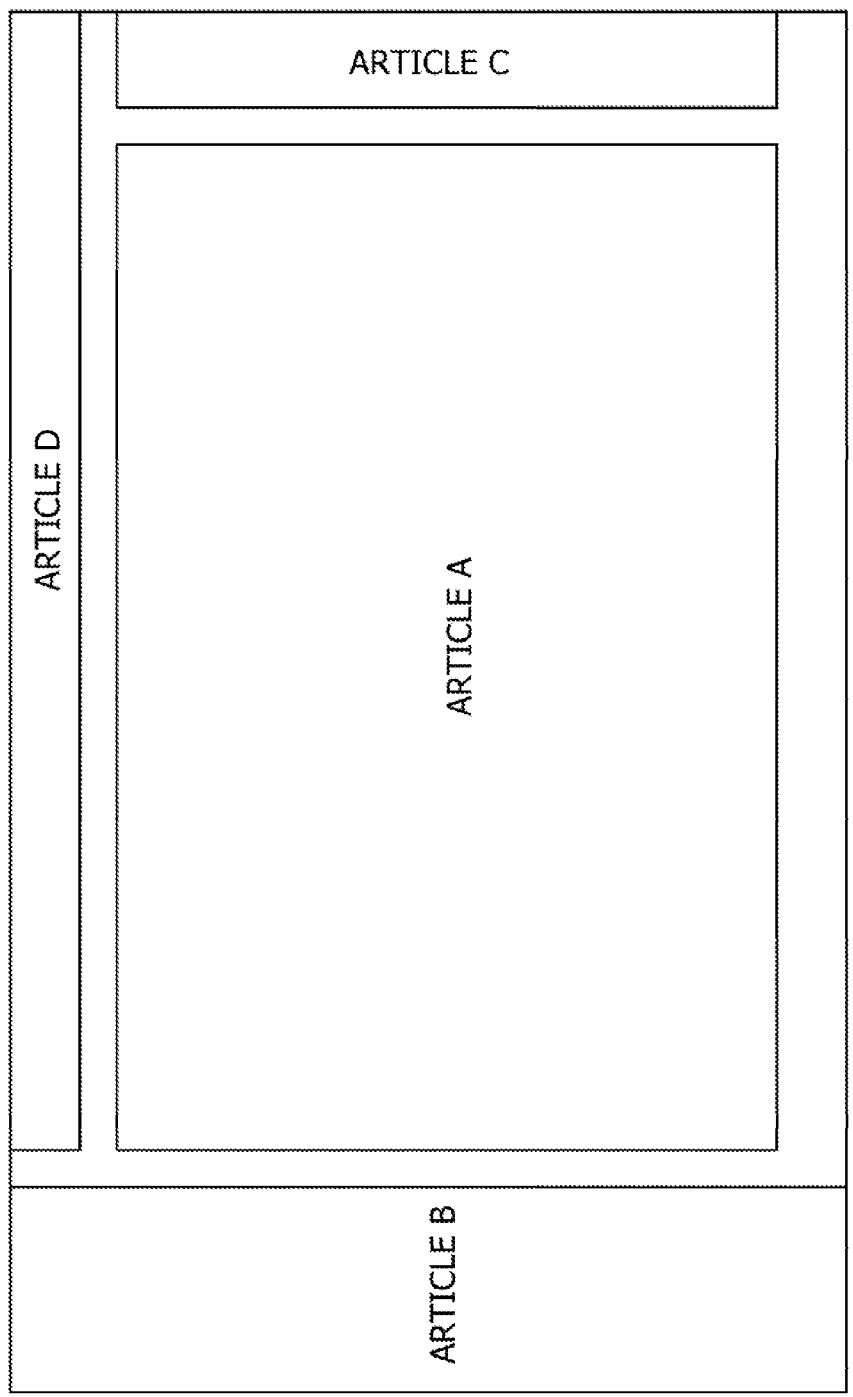
FIG. 9 is a view depicting an example of a newspaper article displayed on a display apparatus.

FIG. 9 depicts an example of a newspaper article displayed on the display apparatus 20. The user would operate the analog stick 24a to scroll the newspaper article. The server 5 functions also as a content server and distributes image data of a newspaper article to the information processing apparatus 10. It is to be noted that, although the content server may be provided separately from the server 5 in the information processing system 1, in the following description, it is assumed that the server 5 functions as a content server.

The user activity information production unit 204 acquires identification information of a newspaper article from the server 5 and supervises operation information acquired by the operation information acquisition unit 202. While a scrolling instruction (image changing instruction) continues to be inputted, the user activity information production unit 204 determines that the user A does not view the article. If a predetermined period of time (for example, 10 seconds) elapses after the last scrolling instruction, then the user activity information production unit 204 determines that the user A is viewing the article. At this time, the user activity information production unit 204 specifies which one of articles has the highest screen image occupancy rate (ratio in area of the displayed article to the area of the display apparatus 20) on the display apparatus 20 and specifies that, in the example depicted in FIG. 9, the screen image occupancy rate of an article A is highest. Consequently, the user activity information production unit 204 determines that the user A is viewing the article A and produces user activity information including information (content ID) for specifying the article A and information for specifying the display application. It is to be noted that the newspaper article data distributed from the server 5 includes layout information of articles, and the user activity information production unit 204 can grasp the display regions of articles on the display apparatus 20 based on the layout information and can determine the screen image occupancy rates of the articles from the display regions.

Figure 10:
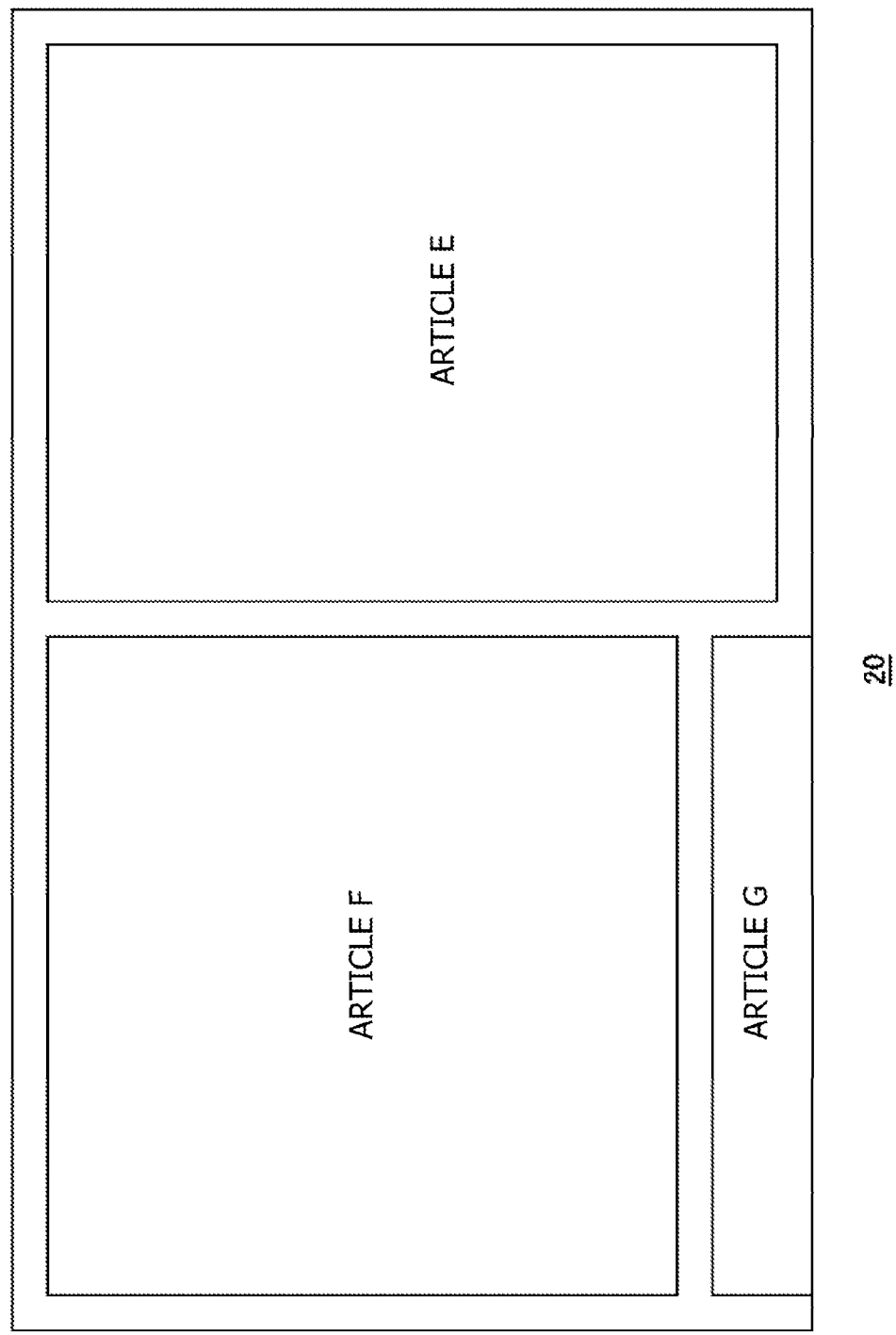
FIG. 10 is a view depicting another example of a newspaper article displayed on the display apparatus.

FIG. 10 depicts another example of newspaper articles displayed on the display apparatus 20. The user activity information production unit 204 acquires identification information of newspaper articles from the server 5 and supervises operation information acquired by the operation information acquisition unit 202. If a predetermined period of time elapses after the operation information acquisition unit 202 acquires the image changing instruction last, then the user activity information production unit 204 determines that the user A is viewing an article displayed on the display apparatus 20. At this time, if a predetermined ratio (for example, 50%) of an article or more is displayed, then the user activity information production unit 204 determines that the user A is viewing the article. The user activity information production unit 204 specifies the display area (display ratio) of each article based on layout information of the articles. In the example depicted in FIG. 10, the user activity information production unit 204 determines that an article E and another article F are being viewed and produces user activity information including information for specifying the articles E and F and information for specifying the display applications.

Figures 11, 12:
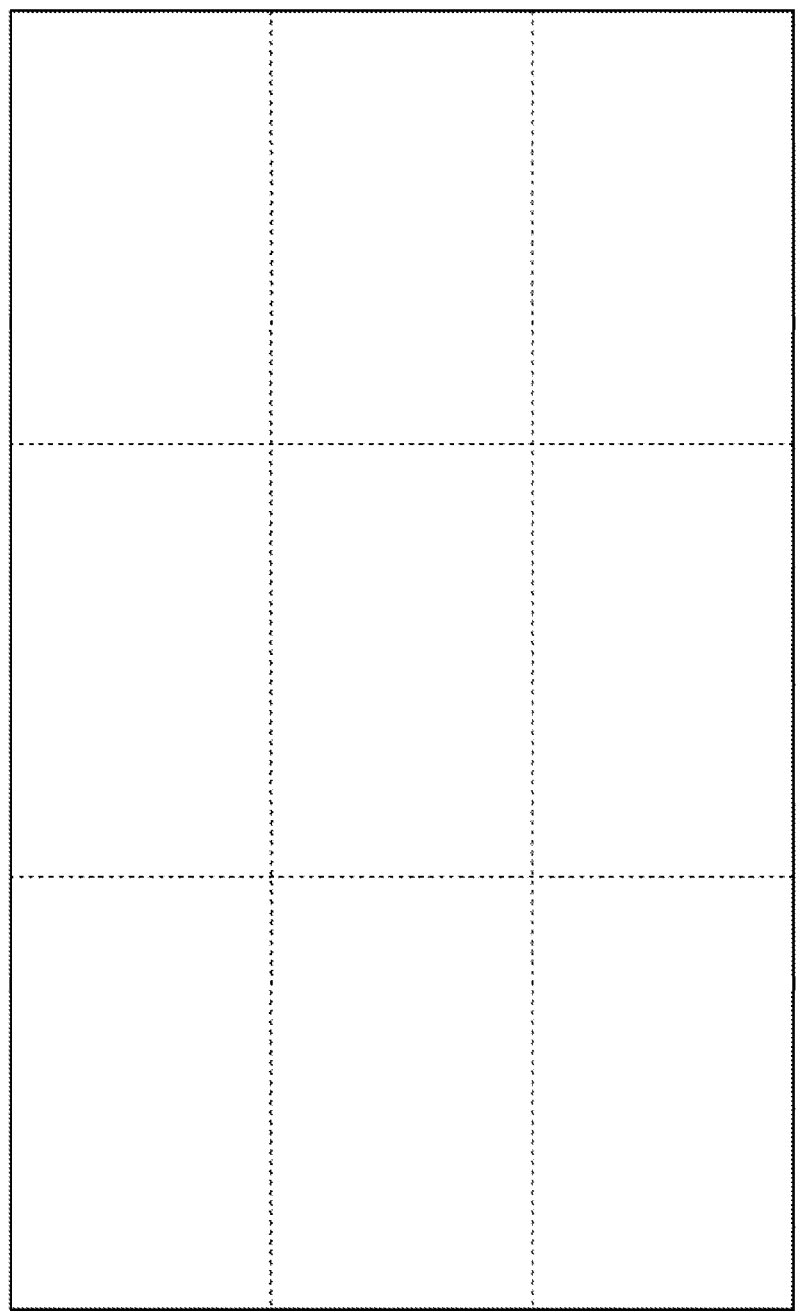
FIG. 11 is a view illustrating an example in which the display apparatus is divided into a plurality of regions.
FIG. 12 is a view illustrating an example of content information in a content information retaining unit.

FIG. 11 depicts an example wherein the display apparatus 20 is divided into a plurality of regions. Here, the display apparatus 20 is divided into 3×3=9 regions. The user activity information production unit 204 produces user activity information including information for specifying regions in which gravity center positions of displayed articles are included, information for specifying the displayed articles and information for specifying the display application. It is to be noted that, since it is considered that the interest degree of the user A is higher in a display article having a gravity center position nearer to the central region, when the server 5 receives user activity information, it may set a point number such that a point number to be added to information of an article having a gravity center position nearer to the central region is higher than a point number to be added to information of an article having a gravity center position in an end region.

It is to be noted that the foregoing description relates to the production process of user activity information when a content is displayed on the display apparatus 20. In the case of an audio content, the user activity information production unit 204 produces user activity information including information for specifying a music player (application) by which sound is outputted from the speaker 25 and information (content ID) for specifying the content. It is to be noted that, as a condition for producing user activity information, it is necessary for the audio content to be reproduced for a predetermined period of time or more. Further, in the case of a game application, the user activity information production unit 204 produces user activity information including information (content ID) for specifying a game. It is to be noted that, as a condition for producing user activity information, it is necessary for a game to be played for a predetermined period of time or more. In this manner, the user activity information production unit 204 produces user activity information including necessary information in response to the type of an application or a content.

The transmission unit 206 transmits user activity information produced by the user activity information production unit 204 to the server 5 together with a user account of the user A. It is to be noted that the transmission unit 206 may transmit user activity information to the server 5 every time the user activity information production unit 204 produces user activity information or may transmit user activity information after every predetermined period of time. Further, in the present embodiment, since user activity information is used for production of a user-customized menu screen image, when the information processing apparatus 10 transmits a displaying request for a menu screen image to the server 5, the information processing apparatus 10 may transmit the displaying request to the server 5 together with the latest user activity information.

If the user activity information acquisition unit 302 in the server 5 acquires a user account and user activity information from the information processing apparatus 10, then the user activity information is recorded in an associated relationship with the user account into the user activity information recording unit 310. When the user starts up the application and executes the content as described above, the user activity information includes at least information (application ID) for specifying the application and the content ID.

The content information retaining unit 312 retains so-called meta information in an associated relationship with information for specifying a content.

FIG. 12 depicts an example of content information in the content information retaining unit 312. The content information is retained in the form of a table, and FIG. 12 depicts content information of music contents. "Content ID" represents information (music piece XYZ) for specifying a music content; "Artist" represents information (rock band ABC) for specifying an artist of the music piece; "Album name" represents information (DEF) for specifying an album including the music piece XYZ; and "Genre" represents information (rock) for specifying a genre of the music piece XYZ. The artist, album name and genre are meta information and are information elements. The information elements make a display target in the menu screen image, and in the simplest form, the "music piece XYZ," "rock band ABC," "DEF" and "rock" are displayed in a text for selection from the user on the menu screen image. It is to be noted that the item of "Application" is not content information but is utilized upon point calculation hereinafter described.

A point set for each item is a point number provided to an information element indicated as an item when a content (music piece XYZ) is reproduced. In particular, if the "music piece XYZ" is reproduced, then 3 points are added to "music piece XYZ"; 2 points to the "rock band ABC"; 2 points to the "DEF"; 0.1 points is added to the "rock"; and 0.01 points to the "music player AA." This point calculation process is executed by the interest degree derivation unit 304.

The interest degree derivation unit 304 uses the user activity information to refer to the table retained in the content information retaining unit 312 to derive a point number of an information element. The interest degree recording unit 314 records an interest degree (point number) of each information element for each user, and the interest degree derivation unit 304 updates the interest degree of the interest degree recording unit 314 using the user activity information. If the music piece XYZ is reproduced by the user A, then the interest degree derivation unit 304 adds 3 points to the accumulated point number of the "music piece XYZ," adds 2 points to the accumulated point number of the "rock band ABC"; adds 2 points to the accumulated point number of the "DEF"; adds 0.1 points to the accumulated point number of the "rock"; and adds 0.01 points to the accumulated point number of the "music player AA."

In this manner, the interest degree derivation unit 304 uses the user activity information to derive an interest degree of an information element and records the interest degree into the interest degree recording unit 314 in an associated relationship with the user account. The interest degree derivation unit 304 may execute the point calculation process described above every time the user activity information acquisition unit 302 acquires activity information of the user or when a displaying request for the menu screen image is received from the information processing apparatus 10. Consequently, the server 5 can calculate, for each user, interest degrees (point numbers) regarding a plurality of information elements and can select the plurality of information elements in a descending order of the point number.

It is to be noted that, as described hereinabove with reference to FIG. 11, the interest degree derivation unit 304 may add a different number of points, for example, in response to the display region and may determine a point number to be added in accordance with such a displaying situation.

<Mechanism for Producing Menu Image Data>

The server 5 derives an interest degree of a user in an information element and records the interest degree into the interest degree recording unit 314. In the following, a mechanism by which the server 5 produces menu image data and the information processing apparatus 10 displays a menu screen image is described.

Figure 13:
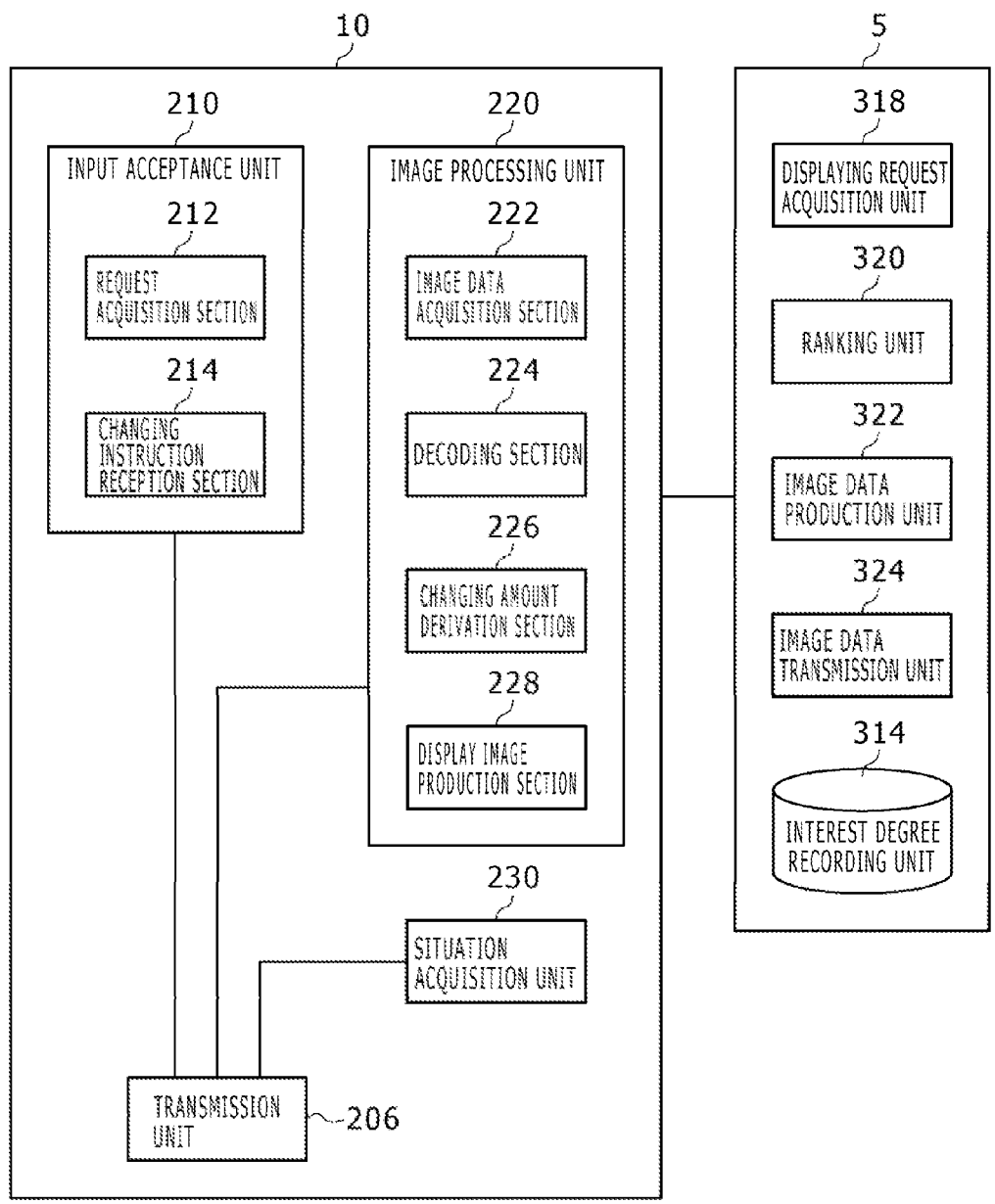
FIG. 13 is a view depicting functional blocks for displaying a menu screen image in the information processing system.

FIG. 13 depicts functional blocks for displaying a menu screen image in the information processing system 1. The information processing apparatus 10 includes the transmission unit 206, an input acceptance unit 210, an image processing unit 220 and a situation acquisition unit 230. The server 5 includes a Displaying request acquisition unit 318, a ranking unit 320, an image data production unit 322, an image data transmission unit 324 and an interest degree recording unit 314. The input acceptance unit 210 has a function for accepting operation information from the operation unit 70 and includes a request acquisition section 212 and a changing instruction reception section 214. The image processing unit 220 has a function for executing a displaying process for a display image, particularly a function for executing image changing processes such as enlargement/reduction, scrolling and so forth of a display image. The image processing unit 220 includes an image data acquisition section 222, a decoding section 224, a changing amount derivation section 226 and a display image production section 228.

Referring to FIG. 13, elements described as functional blocks which carry out various processes can be configured, in hardware, from a CPU (Central Processing Unit), a memory and other LSIs and can be implemented, in software, from a program loaded in the memory or the like. Accordingly, it can be recognized by those skilled in the art that the functional blocks can be implemented in various forms such as a form only of hardware, a form only of software or a combination of hardware and software and the functional blocks are not limited to any of the forms.

In the information processing apparatus 10, the request acquisition section 212 acquires a displaying request for a menu screen image. This displaying request may be produced by an operation of the operation unit 70 by a user or may be produced automatically when the main power supply for the information processing apparatus 10 is turned on. The transmission unit 206 transmits the displaying request for a menu screen image to the server 5. In the server 5, the Displaying request acquisition unit 318 acquires the displaying request for a menu screen image from the information processing apparatus 10.

In the present embodiment, the information processing apparatus 10 displays a menu screen image using the hierarchical data 128 produced by the image data production unit 322. The hierarchical data 128 has a plurality of hierarchies as depicted in FIG. 5, and on the information processing apparatus 10, the inputting function for enlargement/reduction instruction of a display image is allocated to the analog stick 24b on the right side. The user can input a reduction instruction of a display image by pulling the analog stick 24b to the near side and can input an enlargement instruction of a display image by pushing the analog stick 24b from the near side.

In the present embodiment, in order to implement a user interface for carrying out a smooth enlargement/reduction process, the zeroth hierarchy 130 in the hierarchical data 128 represents a menu image different from the first hierarchy 132 to the third hierarchy 136. If the user zooms out (reduces) the display image, then the displayed information of the text and so forth reduces, and if the display image reduces exceeding a certain scale factor, then the display image has a size of a pea or the like and cannot be read any more. In order to make it possible to provide significant information to a user even when an instruction for reducing the display image exceeding the certain scale factor is inputted, the hierarchical data 128 is preferably configured including a plurality of different menu images.

Figure 14:
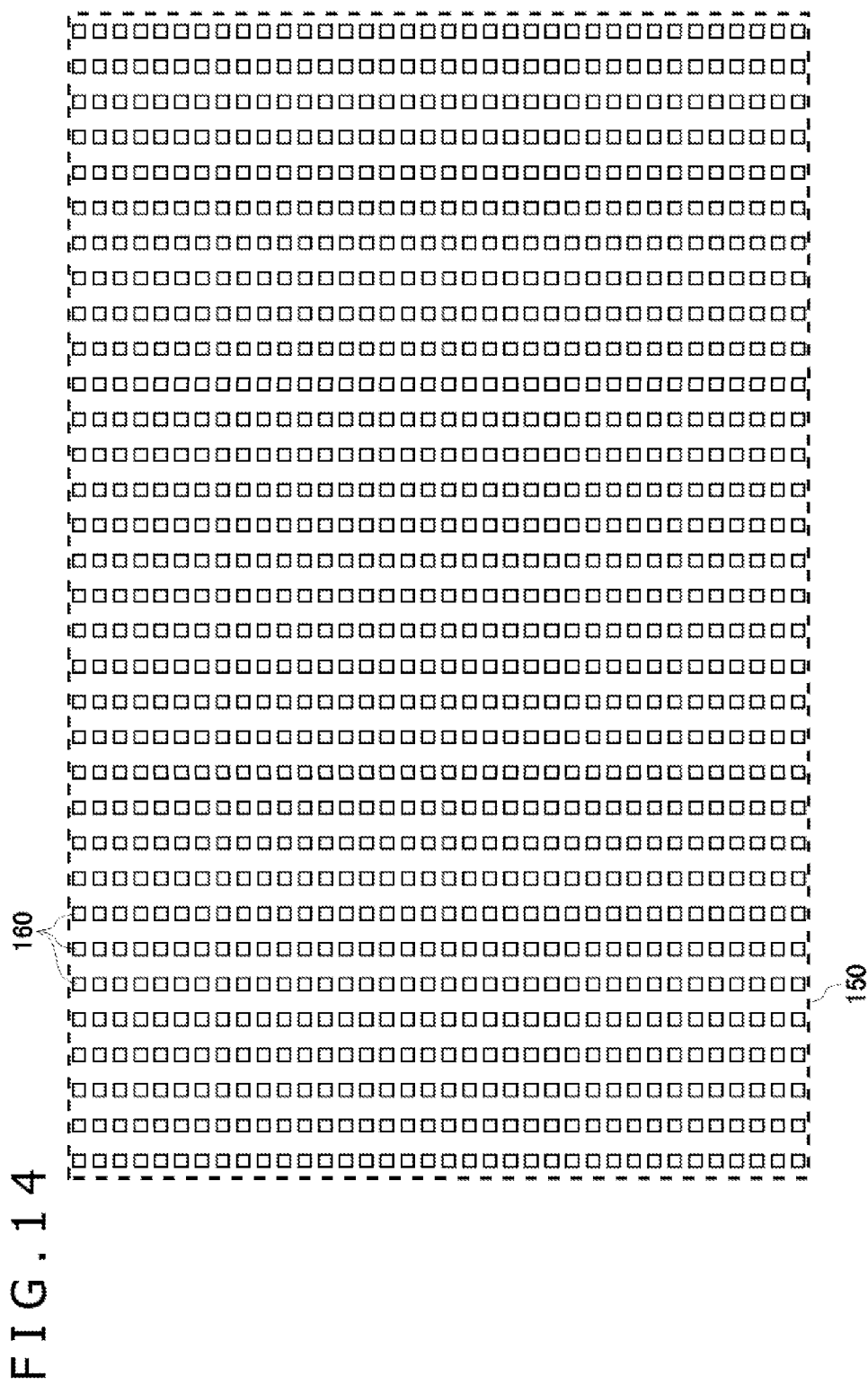
FIG. 14 is a view depicting an example of menu image data produced by an image data production unit.

FIG. 14 depicts an example of menu image data produced by the image data production unit 322. A full menu image 150 is an infinite plane and has information elements 160 as a plurality of display articles arrayed thereon. It is to be noted that, although, in FIG. 14, all of the information elements 160 are represented in the same shape and the same size, the shapes and the sizes of the information elements 160 may be different from each other. When the full menu image 150 is to be produced, the image data production unit 322 may array all of the information elements 160 for which points are accumulated for the user A. However, since an information element 160 to which, for example, a number of points smaller than a predetermined number are provided may not be included in the full menu image 150 because the interest of the user in the information element 160 is low. On the other hand, even if points are not provided to an information element 160 recommended by the server 5, the information element 160 may be included in the full menu image 150.

This full menu image 150 configures entire images of the first hierarchy 132, second hierarchy 134 and third hierarchy 136 of the hierarchical data 128. Although an entire image of the zeroth hierarchy 130 is hereinafter described, it is an entire image with which the menu screen image can be looked down entirely when the menu screen image is zoomed out.

In the information processing apparatus 10, part of the full menu image 150 is displayed as a menu screen image on the display apparatus 20. The user would operate the right side analog stick 24b to enlarge/reduce the menu screen image or would operate the left side analog stick 24a to scroll the menu screen image to search for a desired information element 160.

Figure 15:
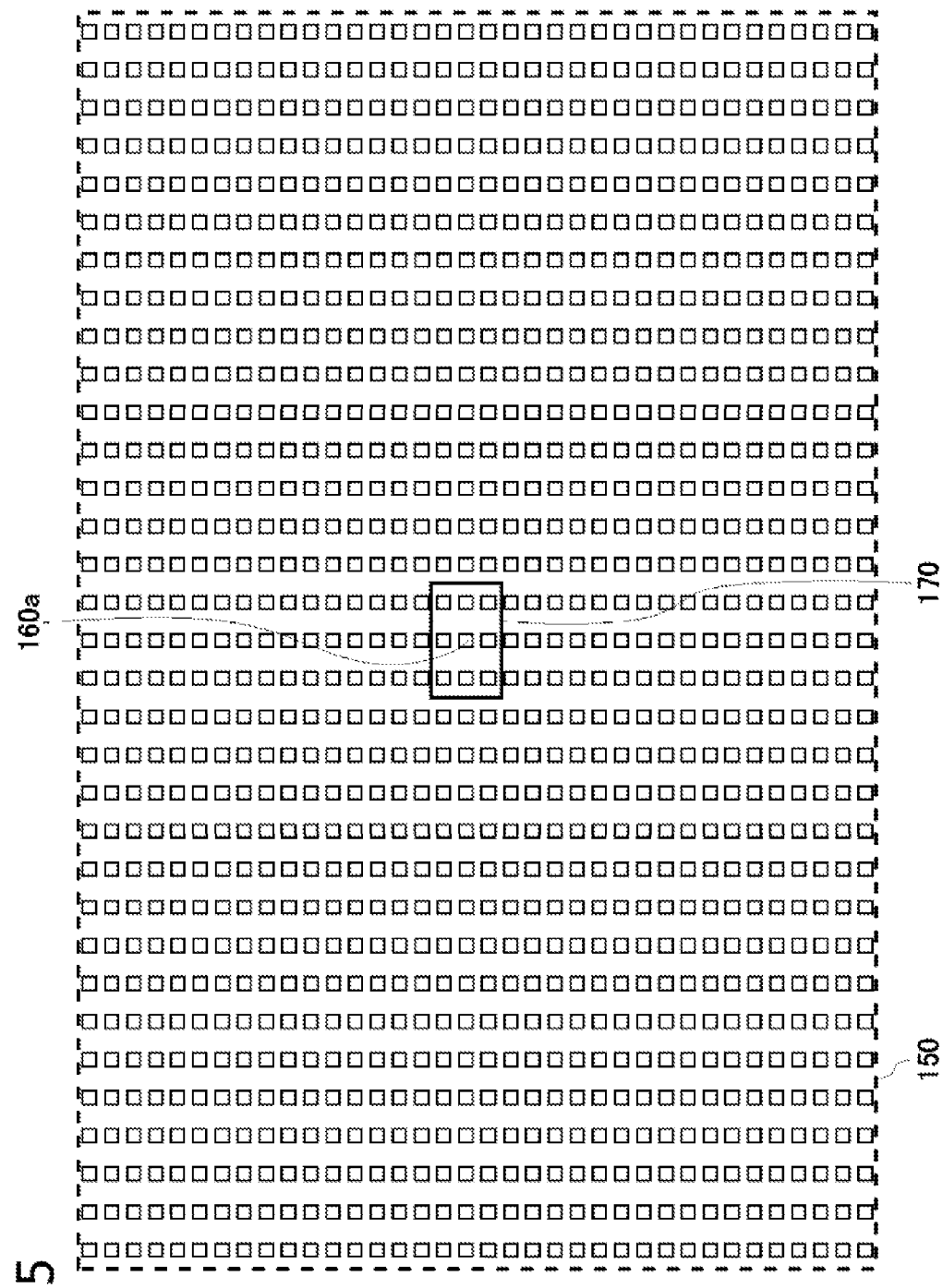
FIG. 15 is a view depicting a virtual framework of a full menu image.

FIG. 15 depicts a virtual framework 170 in the full menu image 150. The framework 170 virtually indicates a frame of the display apparatus 20 when a menu image is displayed at a predetermined resolution and accordingly indicates a region cut out from the full menu image 150 and displayed on the display apparatus 20. In FIG. 15, the framework 170 represents a region of a menu screen image (initial menu screen image) to be displayed first on the display apparatus 20. In particular, if the information processing apparatus 10 receives image data first from the server 5, then it causes an image surrounded by the framework 170 depicted in FIG. 15 to be displayed as an initial menu screen image on the display apparatus 20.

The menu screen image in the present embodiment can be scrolled freely by an operation of the analog stick 24a. Accordingly, if the initial menu screen image is set to a central region of the full menu image 150, then in comparison with an alternative case in which the initial menu screen image is set to an end region, the user can easily search out an information element 160 at an upper, lower, left or right position of the analog stick 24a. Therefore, in the present embodiment, a region including an information element 160a positioned at the center of the full menu image 150 from among a plurality of arrayed information elements 160 is included at the center of the initial menu screen image. Consequently, the user can readily search out a peripheral information element 160 around the center at the information element 160a, and a user interface superior in operability can be implemented.

It is to be noted that, if a relationship between the menu screen image and the virtual framework 170 is described, then that the menu screen image is scrolled corresponds to that the framework 170 is moved in the scrolling direction without changing the size thereof, and information elements within the frame of the framework 170 are displayed on the menu screen image. Further, if the menu screen is enlarged, then the size of the framework 170 reduces, and accordingly the information elements are displayed in an enlarged scale. However, but if the menu screen image is reduced, then the size of the framework 170 increases, and accordingly, information elements are displayed in a reduced scale.

Referring back to FIG. 13, if the Displaying request acquisition unit 318 acquires a displaying request, then the ranking unit 320 reads out interest degrees in the information elements of the user A from the interest degree recording unit 314. The ranking unit 320 ranks the plurality of information elements in response to the user interest degrees derived in regard to the individual information elements, and particularly compares the interest degrees (point numbers) of the plurality of information elements to determine ranks of the information elements. Here, the ranks of the information elements are determined in a descending order from the first rank applied to the information element having the greatest point number. The ranking unit 320 notifies the image data production unit 322 of a plurality of combinations of the information elements and the determined ranks. The image data production unit 322 produces, regarding the user A, menu image data in which the plurality of information elements are disposed in accordance with the ranks with reference to the predetermined position. As an example, the image data production unit 322 produces menu image data depicted in FIG. 14 or 15.

Figure 16:
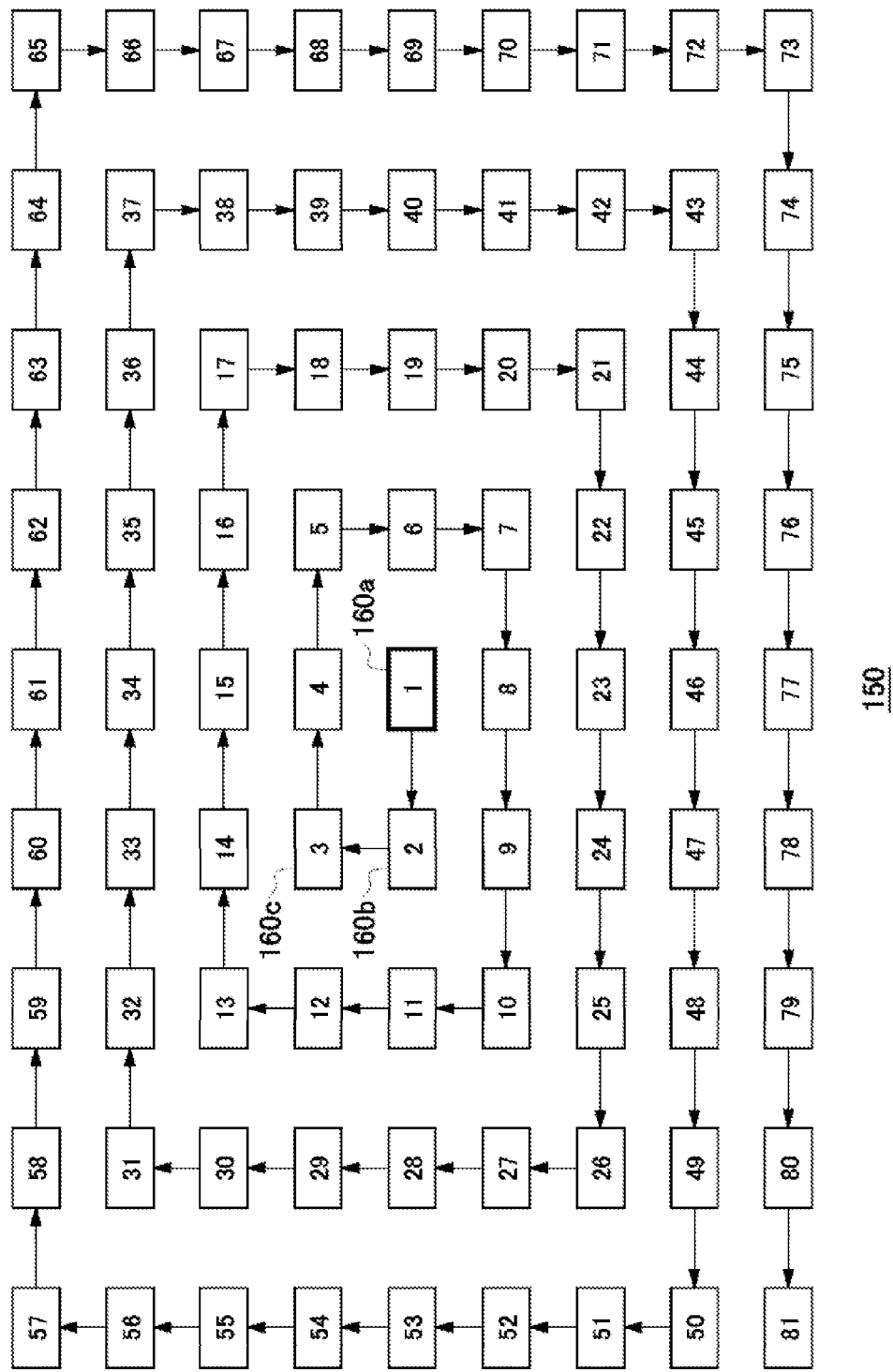
FIG. 16 is a view illustrating an example of arrangement of information elements.

FIG. 16 illustrates an example of arrangement of information elements. The image data production unit 322 arrays the information elements 160 in a descending order of the point number with reference to the predetermined position of the full menu image 150. Referring to FIG. 16, a numeral displayed in each rectangular frame indicates a rank of the degree of interest, and a symbol "N" indicated in each rectangular frame represents that the information element is an information element 160 of the Nth greatest point number regarding the user A.

Here, the image data production unit 322 disposes the information element 160a of the highest point number in the central region or a substantially central region of the initial menu screen image; disposes an information element 160b of the second greatest point number at the left side of the information element 160a; disposes an information element 160c of the third greatest point number at the upper side of the information element 160b; and disposes other information elements 160 in a descending order of the point number such that a clockwise spiral centered at the information element 160a may be drawn. The image data production unit 322 disposes the information elements 160 in a clockwise descending order of the point number with reference to the predetermine position (central region) of the initial menu screen image in this manner. At the predetermined position which is used as the reference, the information element 160a in which the interest degree of the user A is highest is disposed, and accordingly, the predetermined position is set to a position which can be viewed easily by the user A.

From the foregoing, on the initial menu screen image, information elements 160 in which the interest of the user A is high can be arrayed in a concentrated manner, and information elements 160 in which the interest is relatively high can be collected around the central region of the initial menu screen image. In this manner, the image data production unit 322 produces image data with which information elements 160 in which the interest of the user is relatively high are disposed two-dimensionally at the central position and positions proximate to the central position while information elements 160 in which the interest of the user is relatively low are disposed two-dimensionally at positions remote from the central position. It is to be noted that, while, in the example of FIG. 16, the information elements 160 are arrayed clockwise in a descending order of the point number around the center at the information element 160a, the information elements 160 may be arrayed counterclockwise in a descending order of the point number or may be arrayed in a different manner. Further, such image data may otherwise have a three-dimensional array structure in addition to a two-dimensional array.

It is to be noted that, where information elements are categorized, the direction from the central position may be determined for each category. For example, where the information elements are classified into four categories, they may be disposed such that, around the center provided by the central position, information elements of the first category are disposed in the first quadrant; information elements of the second category in the second quadrant; information elements of the third category in the third quadrant; and information elements of the fourth category in the fourth quadrant. Further, the information elements may be disposed such that the interest degree increases toward the center but decreases away from the center.

Figure 17:
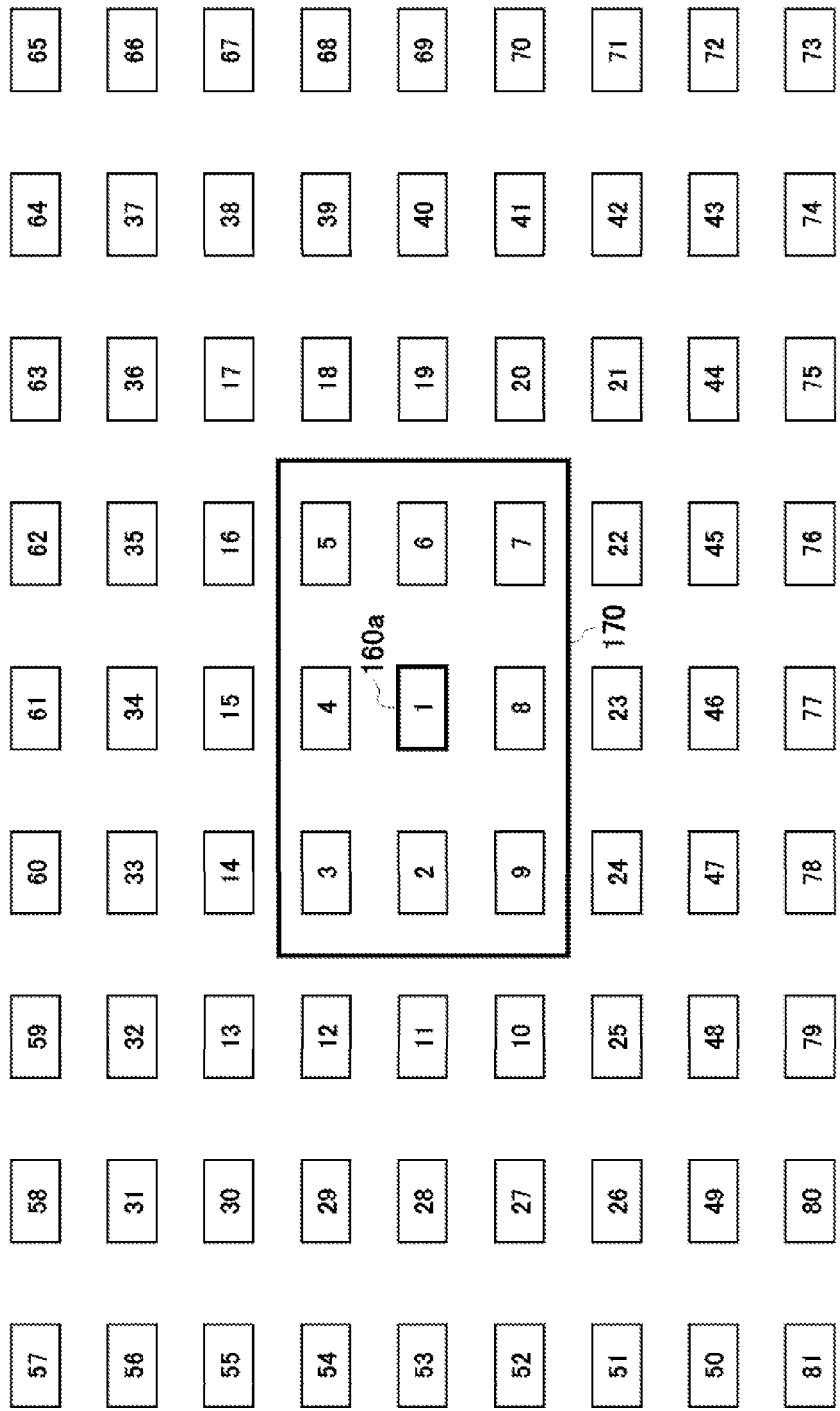
FIG. 17 is a view depicting a virtual framework of an initial menu screen image of the full menu image.

FIG. 17 depicts the virtual framework 170 for an initial menu screen image of the full menu image. In this example, nine top information elements 160 in which the interest degree of the user A is high are displayed on the initial menu screen image. It is to be noted that, also when the user scrolls the menu screen image upwardly, downwardly, leftwardly or rightwardly, since the full menu image 150 has the layout in which information elements 160 in which the interest degree is high are arrayed in the central region and in the proximity of the central region, the user A can find out an information element 160 in which the interest thereof is high by a small scrolling amount. It is to be noted that, in the full menu image 150, the interest degree in a displayed information element 160 gradually decreases as the scrolling amount increases.

After the image data production unit 322 produces the full menu image, it reduces the produced full menu image at a plurality of stages to produce images of different resolutions and divides the image of each hierarchy into one or a plurality of tile images thereby to represent the full menu image in a hierarchical structure. Here, after the image data production unit 322 produces the full menu image, it determines the full menu image as image data of the third hierarchy 136 and reduces the full menu image to produce image data of the second hierarchy 134 and the first hierarchy 132. The image data produced in this manner is transmitted to the information processing apparatus 10 by the image data transmission unit 324.

Figure 18:
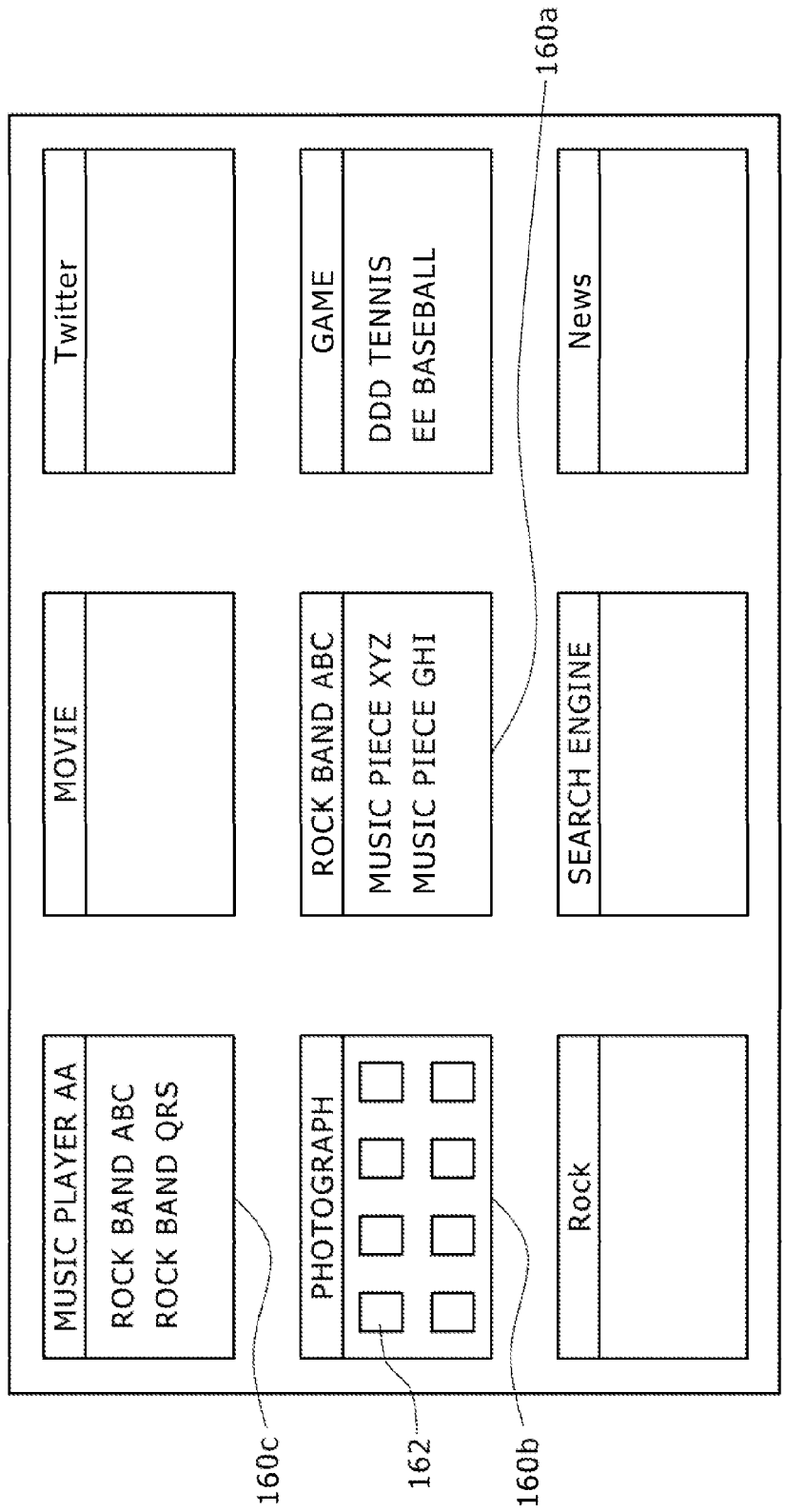
FIG. 18 is a view depicting an example of the initial menu screen image.

FIG. 18 depicts an example of the initial menu screen image. Here, nine top information elements 160 regarding the interest degree are depicted. Each information element 160 which is a display article may be displayed, for example, in the form of a rectangle, and a label indicative of the substance of the information element 160 and an information element related to the information element 160 may be displayed. For example, in the information element 160a, a label "rock band ABC" is displayed and, in the inside of the rectangle which configures a frame, "music piece XYZ" and "music piece GHI" which are information elements in which the interest degree of the user is high with regard to the "rock band ABC" are displayed. It is to be noted that, although the displayed information elements 160 shown in the figure include those information elements 160 in which the inside of the rectangle is blank, different information elements in which the interest degree of the user is high are preferably described in the information elements 160.

By arraying information elements 160 in which the interest degree of the user is high on the initial menu screen image in this manner, it is possible for the user A to readily execute an application or a content in which the interest degree is high. Further, since information elements 160 of applications or contents in which the interest degree is high are arrayed in the proximity of a central region of the initial menu screen image, even if a desired information element 160 is not included in the initial menu screen image, by reducing the menu screen image so that information elements 160 which have not been included in the initial menu screen image are displayed newly, it becomes possible to readily find out the desired information element 160.

Referring back to FIG. 13, in the information processing apparatus 10, the image data acquisition section 222 acquires image data from the server 5. In order that the information processing apparatus 10 can display the initial menu screen image depicted in FIG. 18 rapidly, the image data production unit 322 in the server 5 may produce, before it produces hierarchical data, image data for producing only the initial menu screen image and the image data transmission unit 324 may transmit the image data first to the information processing apparatus 10. Consequently, the display image production section 228 can produce the initial menu image and allow the initial menu screen image to be displayed immediately on the display apparatus 20. In the server 5, after the image data transmission unit 324 transmits image data for producing the initial menu image, it may transmit hierarchical data configured from the first hierarchy 132 to third hierarchy 136.

If the image data acquisition section 222 acquires image data, then the decoding section 224 decodes the image data and develops the decoded image data into the main memory 64. Then, the display image production section 228 produces an initial menu image, and the display apparatus 20 displays the initial menu screen image. If the user operates the analog stick 24 of the operation unit 70, then the changing instruction reception section 214 accepts the operation information as an image changing instruction.

The changing amount derivation section 226 derives a changing amount of the display image requested for display based on the changing instruction signal. The changing amount of the display image is an amount of movement in the upward, downward, leftward or rightward direction of the display image for each one frame and a movement amount in the depthwise direction in a virtual three-dimensional space of the hierarchical data. The display image production section 228 determines space coordinates (position information) of a current frame to be moved depending upon the derived changing amounts from space coordinates of a preceding frame. Here, the space coordinates are position information (X, Y, SCALE) specified by the center coordinates (X, Y) and the scale factor SCALE of the frame image. The changing amount derivation section 226 derives changing amounts (ΔX, ΔY, ΔSCALE) in accordance with the changing instruction signal, and the display image production section 228 adds the changing amounts (ΔX, ΔY, ΔSCALE) to the position information (Xprev, Yprev, SCALEprev) of the preceding frame to determine the position information (X, Y, SCALE) of the current frame. Although the display image production section 228 specifies the scale factor SCALE of an image to be displayed in this manner, the display image production section 228 may otherwise specify information relating to the scale factor such as a resolution as described hereinabove.

The transmission unit 206 transmits space coordinates determined by the display image production section 228 to the server 5. When the space coordinates are received, the server 5 determines whether or not it is necessary to change the tile images in order to produce a display image in the information processing apparatus 10 and provides, when it is necessary to change the tile images, tile images to the information processing apparatus 10. When the image data acquisition section 222 acquires the tile images, it causes the tile images to be retained by the main memory 64. The decoding section 224 reads out tile images to be used for production of a display image from the main memory 64 and decodes the tile images and then causes the decoded tile images to be retained by a buffer memory (not depicted). The display image production section 228 produces a display image (frame image) using the tile images retained in the buffer memory based on the position information and supplies the display image to the frame memory (not depicted).

Since the display image production section 228 produces a display image in such a manner as described above, the information processing apparatus 10 can execute an enlarging or reducing process or a scrolling process of the display image quickly and provide a smooth change of the image to the user.

In the menu screen image depicted in FIG. 18, enlargement display of an information element corresponds to a selection operation of the information element 160. The selection operation is executed when the screen image occupancy rate of the information element (ratio in area of the information element to the area of the display apparatus 20) exceeds a predetermined value (for example, 60%). It is to be noted that the behavior of the information element after the selection operation is determined in accordance with the information element, and, for example, if a thumbnail image 162 included in the information element 160b is selectively operated, then a photograph image corresponding to the thumbnail image 162 is displayed on the display apparatus 20. At this time, also the thumbnail image 162 is an information element, and if an information element corresponding to a content (in this case, a photograph image) is selectively operated, then a corresponding application (in this case, a viewer) processes the content. It is to be noted that, in the information processing apparatus 10 in a state in which the menu screen image is displayed, an application is in a state in which it is started up already, and if a content is selectively operated, then the application can preferably process the content immediately.

On the other hand, if a content is not selectively operated on the enlarged display of the information element 160, the information processing apparatus 10 further provides a content selection screen image of the information element 160 to the user. For example, if the user scrolls the initial menu screen image to move the information element 160c to the central region of the screen image and displays the information element 160c in an enlarged scale so that the screen image occupancy rate of the information element 160 increases 60%, then the image data acquisition section 222 produces a displaying request for image data associated with the information element 160c and the transmission unit 206 transmits the displaying request to the server 5. When the Displaying request acquisition unit 318 in the server 5 acquires the displaying request, the ranking unit 320 reads out the interest degree in the information element related to the information element 160c (music player AA) from the interest degree recording unit 314.

It is to be noted that the information element related to the music player AA is an information element to which a point or points are added when the interest degree derivation unit 304 adds a point to the music player AA. In particular, an audio content and meta information of the audio content when the audio content is reproduced by the music player AA become information elements related to the music player AA. The ranking unit 320 reads out the interest degree of the information elements from the interest degree recording unit 314 and ranks the plurality of information elements in response to the user interest degrees derived with regard to the information elements. In particular, the ranking unit 320 compares the interest degrees (points) of the plurality of information elements to determine ranks of the information elements. The ranking unit 320 notifies the image data production unit 322 of combinations of the information elements and the determined ranks. The image data production unit 322 produces menu image data in which the plurality of information elements are disposed in accordance with the ranks with reference to a predetermined position and the image data transmission unit 324 transmits the produced menu image data to the information processing apparatus 10.

Figure 19:
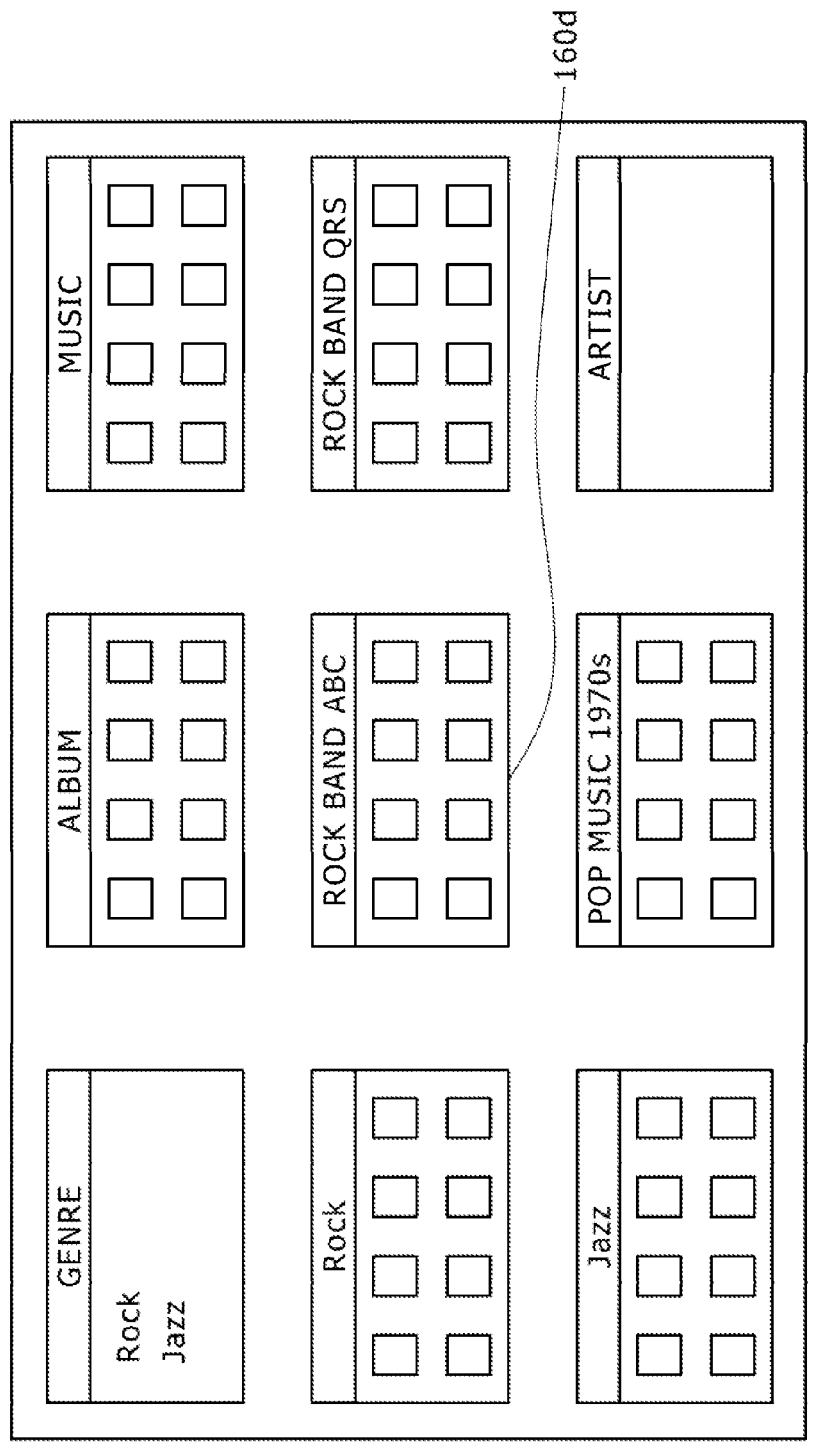
FIG. 19 is a view depicting a content selection screen image displayed on the display apparatus after information elements are displayed in an enlarged scale.

FIG. 19 depicts a content selection screen image displayed on the display apparatus 20 after the information element 160c is displayed in an enlarged scale. The content selection screen image is produced for the music player AA and produced from activity information regarding activities by which the user A used the music player AA in the past. As described hereinabove with reference to FIG. 18, in the central region of the initial menu screen image, an information element 160d in which it is determined that the interest degree is highest is disposed.

Figure 20:
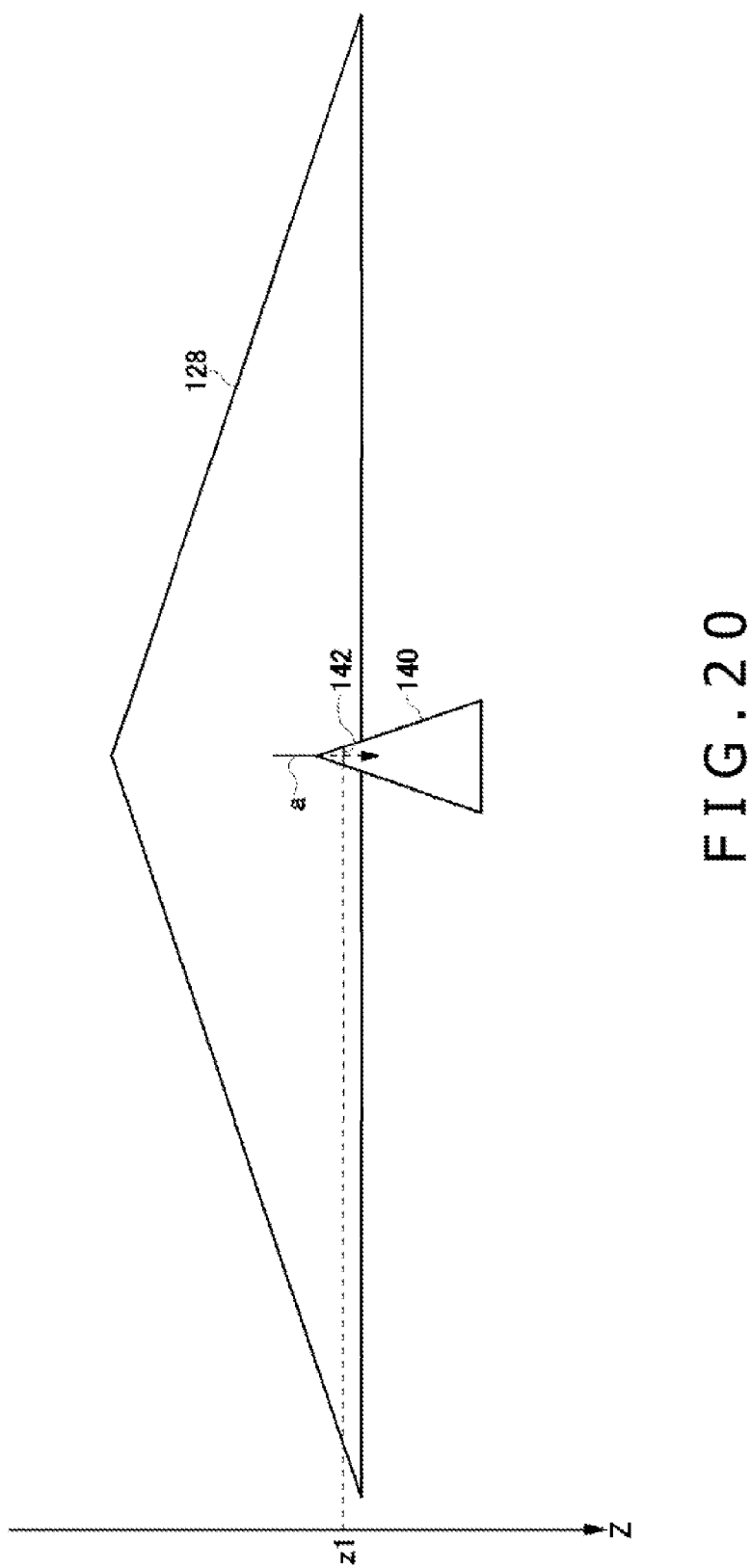
FIG. 20 is a view depicting an example of connection of hierarchical data in the present embodiment.

FIG. 20 illustrates an example of connection of hierarchical data in the present embodiment. To the hierarchical data 128 of the full menu image, hierarchical data 140 of an information element 160 (in the example of FIG. 19, the music player AA) is connected. If, in a menu screen image (refer to FIG. 18) produced using the hierarchical data 128, the information element 160c of the music player AA is moved to the central region of the display apparatus 20 and enlarged, then transition from the menu screen image to a content selection screen image (refer to FIG. 19) is carried out.

In FIG. 20, two triangles represent the hierarchical data 128 and 140. Each of the hierarchical data 128 and 140 actually has a configuration that, as depicted in FIG. 5, a plurality of image data having different resolutions exist discretely in the Z-axis direction of FIG. 20. If the user issues a request for enlargement of the display image through the operation unit 70, then the display region and hence the point of view move in the Z axis direction of FIG. 20. The movement in the Z-axis direction is equivalent to a change in SCALE of the virtual camera image coordinates. On the other hand, if a request for moving the display region upwardly, downwardly, leftwardly or rightwardly is issued, then the display region moves on a horizontal plane of FIG. 20. The movement on the horizontal plane is equivalent to a change of (X, Y) of the virtual camera image coordinates. In such a virtual space as described above, the two hierarchical data 128 and 140 construct a data structure in which they overlap with each other as depicted in FIG. 20.

Then, if the user issues an enlargement request continuously during display of the image of the hierarchical data 128, then the point of view moves as indicated by an arrow mark a and enters into the region of the hierarchical data 140. In other words, the point of view moves between the different hierarchical data. When the point of view advances into a region of different hierarchical data, the data for producing a display image changes over from the hierarchical data 128 to the hierarchical data 140.

In order to construct image data configured from such a plurality of hierarchical data as depicted in FIG. 20, the resolution (SCALE) and the position (X, Y) of an image when changeover between the hierarchical data 128 and the hierarchical data 140 is to be carried out are set in advance. This setting is represented by a line 142 in FIG. 20, and the overlapping degree of the hierarchical data can be determined by the setting. In the example of FIG. 20, at the position represented by the line 142 representing a resolution z1 on the Z axis, changeover from the hierarchical data 128 to the hierarchical data 140 is carried out. Such connection between hierarchical data is called link.

If the image data acquisition section 222 predicts, during enlargement of the menu screen image displayed using the hierarchical data 140, changeover of the display image at a resolution short of the resolution z1, then the image data acquisition section 222 produces a displaying request for a content selection screen image and the transmission unit 206 transmits the displaying request to the server 5. Consequently, when the resolution becomes equal to z1, the image data acquisition section 222 already acquires hierarchical data of the content selection image data from the server 5. Consequently, the display image production section 228 can display the content selection screen image depicted in FIG. 19. It is to be noted that, if a thumbnail image is displayed in an enlarged scale on the content selection screen image as described hereinabove, then the content associated with the thumbnail image is reproduced automatically.

By constructing the image data configured from a plurality of hierarchical data depicted in FIG. 20 in such a manner as described above, changeover of the display image is implemented. While, in FIG. 20, a state in which two hierarchical data are connected to each other by a link is illustrated, three or more hierarchical data may be connected in a multiple stage form by a link. For example, the hierarchical data 128 for producing a menu screen image and the hierarchical data 140 for producing a content selection screen image may be connected to each other by a link, and the hierarchical data 140 and hierarchical data for producing an artist selection screen image for selecting an artist may be connected to each other by a link. At this time, if an information element of "artist" is displayed in an enlarged scale on the content selection screen image depicted in FIG. 19, then the artist selection screen image is displayed. Further, the hierarchical data for producing an artist selection screen image and hierarchical data for producing a music piece selection screen image for selecting a music piece of the artist may be connected to each other by a link. By constructing image data including hierarchical data connected at multiple stages by a link in this manner, also it is possible for the user to reach a desired content only by carrying out a procedure (zooming in) which can be sensuously recognized readily.

While the foregoing description is given of the screen image transition when the menu screen image is displayed in an enlarged scale (zoomed in), in the following, a screen transition when a menu screen image is displayed in a reduced scale (zoomed out) is described.

In the initial menu screen image (refer to FIG. 18) in the present embodiment, the information element 160a in which the interest of the user A is highest is disposed at a central region of the screen and the information elements 160b and 160c and so forth are disposed in a descending order of the interest degree around the central region of the screen. If the user A fails to find out a desired application, content or the like on the initial menu screen image, then the user A can zoom out the initial menu screen image so that information elements 160 which have not been displayed on the initial menu screen image can be displayed on the display apparatus 20. Since, in the full menu image 150, information elements 160 in which the interest of the user A is high are arrayed around the information element 160a, by displaying the initial menu screen image in a reduced scale, the user A can easily find out a desired information element 160.

Meanwhile, where the initial menu screen image is displayed in a reduced scale, it can be predicted that a label of each information element 160 becomes rather difficult to see. Since the label represents the substance of the information element 160, it is not preferable that the label is displayed so small that it cannot be read by the user. Therefore, the display image production section 228 carries out a reduction process of the menu screen image so that the font size of the label does not become smaller than a predetermined value. In particular, when a rectangle is to be reduced, the display region of the label is not made smaller than a predetermined value. In this instance, the display of the label takes precedence, and information described in the rectangle may not be displayed but only the label may be displayed as the information element. It is to be noted that, where the horizontal width of the display region becomes narrow, the text configuring the label may be displayed by ticker display.

However, if the degree of reduction display (scale factor) becomes high, then by ensuring the font size of the label to a predetermined value, labels are displayed in an overlapping relationship with each other and the user becomes less likely to view the labels. Therefore, the hierarchical data 128 in the present embodiment prepares conventionally available menu screen image data in the zeroth hierarchy 130.

FIG. 21(a) depicts an example of a menu screen image produced using image data of the zeroth hierarchy 130. In this menu screen image, a plurality of folder icons 180a to 180e are arrayed in a horizontal direction. Of the folder icons 180a to 180e, the folder icon 180a indicates a folder of photograph contents; the folder icon 180b a folder of music contents; the folder icon 180c a folder of video contents; and the folder icon 180d a network icon. In the vertical direction, content icons 182a to 182d are arrayed. The user can cause a process associated with a desired content icon to be executed by operating the operation unit 70 to scroll the desired content icon to move to a position in a focus region. In the example depicted in FIG. 21(a), the content icon 182a for video contents is disposed in the focus region, and if the user depresses a predetermined button of the operation unit 70, then a reproduction instruction is issued and a corresponding video content is reproduced.

FIG. 21(b) depicts another example of the menu screen image produced using image data of the zeroth hierarchy 130. In this menu screen image, the plurality of folder icons 180a to 180e are arrayed two-dimensionally. If the user operates the operation unit 70 to select a desired folder icon 180, then content icons associated with the folder icon 180 are displayed, and if the user selects one of the content icons, then a corresponding content is executed.

If the user successively reduces the initial menu screen image produced from the image data of the third hierarchy 136 and further reduces the menu screen image produced from the image data of the first hierarchy 132 in such a manner as described above, then the display image production section 228 produces a legacy menu screen image produced from the image data of the zeroth hierarchy 130. The menu screen image depicted in FIG. 21 (a) or FIG. 21 (b) provides a conventional user interface, and if the user cannot search out a desired application or content on the full menu image 150, then the user may zoom out the menu screen image so that the menu screen image depicted in FIG. 21 (a) or FIG. 21 (b) may be displayed on the display apparatus 20. Especially, in the full menu image 150, information elements 160 in which the interest degree is low are disposed at positions remote from the central region. Therefore, when the user intends to search for an information element 160 in which the user has not been interested, it is sometimes convenient to search for the information element 160 from within the menu screen image depicted in FIG. 21 (a) or FIG. 21 (b). In this manner, in the information processing system 1, two different menu screen images are provided to facilitate a search activity of the user for a content or the like.

The present invention has been described hereinabove in connection with the embodiment thereof. The embodiment is illustrative, and it can be recognized by those skilled in the art that various modifications are possible in combinations of the components and the processing processes of the embodiment and that also such modifications remain within the scope of the present invention.

In the information processing system 1 of the embodiment, the information processing apparatus 10 and the server 5 exist as processing apparatus, and the information processing apparatus 10 and the server 5 operate with their respective roles as described hereinabove with reference to FIGS. 8 and 13. However, the functions of the information processing apparatus 10 and the server 5 may be consolidated in one processing apparatus. In particular, one processing apparatus includes functions of both of the information processing apparatus 10 and the server 5 depicted in FIGS. 8 and 13, and the one processing apparatus by itself may have functions for deriving a user interest degree, producing image data based on the user interest degree and displaying the image data.

While, in the embodiment, the display image production section 228 in the information processing apparatus 10 uses the hierarchical data 128 to display a menu screen image on the display apparatus 20, a search window into which a free keyword can be inputted may be added to the menu screen image. The display image production section 228 may form a search window, for example, in the proximity of the center of the menu screen image so that the user can always carry out a keyword search. It is to be noted that, at this time, the display image production section 228 may change the layout of the image defined by the hierarchical data 128 a little to provide a space in which the search window is to be disposed or the search window may be superimposed on a designed image layout. It is to be noted that the display image production section 228 may not always display the search window but may form a search window at a predetermined position of the menu screen image when a predetermined operation is performed on the operation unit 70.

Further, while, in the embodiment, a menu image for selecting an application or a content is displayed as the display image, the display image may be some other image. For example, the display image may be an image in which a category or an article of a newspaper is disposed.

While FIG. 12 illustrates content information of a music content, in the case of a newspaper content, "category" is included as one of items of content information. Here, as information elements which belong to the category, "economics," "politics," "society," "sports," "international," "stock" and so forth are available. The interest degree derivation unit 304 derives the interest degree of each of information elements of the category based on activity information of the user reading a newspaper article. Consequently, it is possible to carry out ranking of the interest degree among the categories by the ranking unit 320. If the user A starts up a newspaper application, then the request acquisition section 212 accepts a displaying request for a newspaper article and the transmission unit 206 transmits the displaying request to the server 5. When the Displaying request acquisition unit 318 of the server 5 accepts the displaying request, the ranking unit 320 ranks the information elements of the categories in response to the user interest degree, and the image data production unit 322 produces image data in which a plurality of information elements (categories) are disposed in accordance with the ranks. It is to be noted that not the categories may be disposed but the articles themselves of the categories may be disposed. Alternatively, pages of a newspaper may be re-arranged in accordance with the ranks. In this manner, the image processing technology of the embodiment can be utilized when not only a menu screen image but all display screen images such as a newspaper screen image are to be produced.

As another application example, the present technology can be utilized for display of an electronic mail address book. For example, addresses of persons may be re-arranged in the order in which an address is registered newly. If the example of FIG. 16 is used, then the information element 160a corresponds to an address registered latest, and the information element 160b corresponds to an address registered second latest. Thus, a friend whose address has been registered recently can be found out readily. At this time, if also a date and time or a place of the registration can be displayed, then the user can recollect where the person is from or who the person is readily. It is to be noted that the addresses of persons may be arranged not in the registration order but in a descending order of the transmission and reception frequency of mails.

The server 5 may produce image data in accordance with a situation of the user A. The situation acquisition unit 230 acquires a situation of the user A, for example, current date and time or current position information calculated by the GPS controlling unit 69, and the transmission unit 206 transmits the user situation to the server 5 together with a displaying request. It is to be noted that, when image data in accordance with the user situation is to be produced, it is necessary for the user activity information production unit 204 to add, to the user activity information, the date and time or the position information of the activity in advance. In the server 5, the ranking unit 320 ranks a plurality of information elements in response to a user interest degree derived from the user activity information which matches with a predetermined situation of the user A.

In particular, it is assumed that an application called "right now application" which preferentially provides information necessary for the user at present is available. If the right now application is started up, then the situation acquisition unit 230 acquires a current situation of the user, and the transmission unit 206 transmits a displaying request by the right now application and the current situation of the user to the server 5. If the Displaying request acquisition unit 318 determines that this displaying request arises from the right now application, then it notifies the interest degree derivation unit 304 of this. Consequently, the interest degree derivation unit 304 selects user activity information in the past within a predetermined period of time including the current time, for example, if the current time is 12 o'clock, then within the period of time from 10 o'clock to 14 o'clock, from the user activity information recording unit 310 and derives interest degrees of a plurality of information elements. It is to be noted that the interest degree derivation unit 304 may select user activity information taking also the current position into account. Consequently, the ranking unit 320 can rank a plurality of information elements in response to user interest degrees derived from user activity information matching with a situation of the user at present. It is to be noted that, for example, if an application called "morning application" which preferentially provides information necessary in the morning to the user is available, then if the morning application is started up, then the transmission unit 206 transmits a displaying request by the morning application and the current situation of the user to the server 5. For example, if the morning application is a standard application in the information processing system 1, then the interest degree derivation unit 304 may derive interest degrees of a plurality of information elements based on user activity information in the past within a predetermined period of time, for example, within the period of time from 5 o'clock to 9 o'clock in advance for the morning application. This makes it possible for the ranking unit 320 to execute the ranking process rapidly in response to the displaying request.

Figure 22:
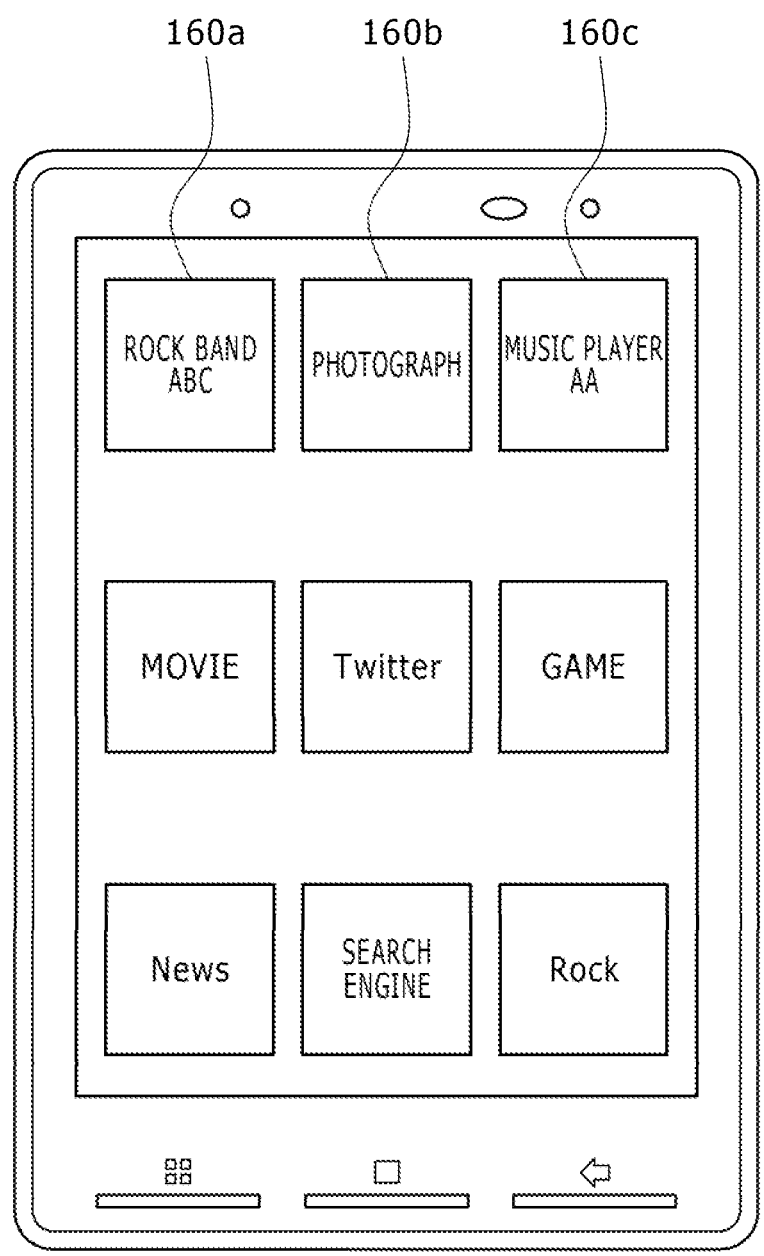
FIG. 22 is a view depicting a modification to the menu screen image.

FIG. 22 depicts a modification to the menu screen image. What is depicted in FIG. 22 is a legacy user interface which is adopted in a smartphone or the like. Here, however, the image data production unit 322 disposes the information element 160a of the highest point number in a corner region of the initial menu screen image; disposes the information element 160b of the second highest point number at the right next position to the information element 160a; disposes the information element 160c of the third highest point number at the right next position to the information element 160b. Further, at each lower stage, information elements 160 are disposed from the left to the right in a descending order of the point number. The image data production unit 322 disposes information elements 160 in a descending order of the point number from an upper stage to a lower stage and from the left to the right with reference to a predetermined position (corner region) of the initial menu screen image in this manner. At the predetermined position as the reference position, the information element 160a in which the interest degree of the user A is highest is disposed. Accordingly, in the menu screen image depicted in FIG. 22, the predetermined position is set to the corner region which can be viewed readily by the user A.

REFERENCE SIGNS LIST

1 . . . Information processing system, 5 . . . Server, 10, 10a, 10b . . . Information processing apparatus, 20 . . . Display apparatus, 24 . . . Analog stick, 60 . . . CPU, 64 . . . Main memory, 69 . . . GPS controlling unit, 70 . . . Operation unit, 128 . . . Hierarchical data, 140 . . . Hierarchical data, 150 . . . Full menu image, 160 . . . Information element, 162 . . . Thumbnail image, 170 . . . Framework, 180 . . . Folder icon, 182 . . . Content icon, 202 . . . Operation information acquisition unit, 204 . . . User activity information production unit, 206 . . . Transmission unit, 210 . . . Input acceptance unit, 212 . . . Request acquisition section, 214 . . . Changing instruction reception section, 220 . . . Image processing unit, 222 . . . Image data acquisition section, 224 . . . Decoding section, 226 . . . Changing amount derivation section, 228 . . . Display image production section, 230 . . . Situation acquisition unit, 302 . . . User activity information acquisition unit, 304 . . . Interest degree derivation unit, 310 . . . User activity information recording unit, 312 . . . Content information retaining unit, 314 . . . Interest degree recording unit, 318 . . . Displaying request acquisition unit, 320 . . . Ranking unit, 322 . . . Image data production unit, 324 . . . Image data transmission unit.

INDUSTRIAL APPLICABILITY

The present invention can be utilized in the technical field in which information elements are displayed.

The invention claimed is:

1. A processing apparatus, comprising:
a ranking unit configured to rank a plurality of information elements in accordance with a user interest degree derived for each of the information elements;
wherein the user interest degree is calculated as an accumulated value of points for each of the plurality of information elements within a rolling fixed period of time; and
an image data production unit configured to produce image data in which the plurality of information elements are disposed in accordance with the respective ranks with reference to a predetermined position,
wherein the produced image data is displayed in a plurality of ranked hierarchal views for display on a display apparatus; and
on an initial screen image displayed first on the display apparatus, an information element in which the user interest degree is highest is displayed at a center or a corner of a screen image, and
on screen images displayed in a lower hierarchal view than the initial screen image, information elements are displayed in categorical groupings,
wherein the categorical groupings are chosen based upon predefined relationships between the information elements and the accumulated points for each of the displayed information elements.

2. The processing apparatus according to claim 1, wherein the image data production unit produces image data in which an information element in which the user interest degree is highest is disposed at the predetermined position.

3. The processing apparatus according to claim 1, wherein the image data production unit produces image data in which an information element in which the user interest is relatively high is disposed at a position near to the predetermined position and an information element in which the user interest is relatively low is disposed at a position remote from the predetermined position two-dimensionally or three-dimensionally.

4. The processing apparatus according to claim 1, further comprising:

an activity information recording unit configured to record activity information of a user for a content and an application; and
an interest degree derivation unit configured to derive a user interest degree of each information element using the user activity information.

5. The processing apparatus according to claim 1, wherein the ranking unit ranks the plurality of information elements in response to user interest degrees derived based on the user activity information which matches with a predetermined situation of the user.

6. The processing apparatus according to claim 1, wherein the fixed period is six months.

7. The processing apparatus according to claim 1, wherein the points for each of the plurality of information elements are increased based upon a length of an interaction period with each of the plurality of information elements by a user.

8. The processing apparatus according to claim 1, wherein points for each of the plurality of information elements are increased proportional to a viewing time of each of the plurality of information elements.

9. The processing apparatus according to claim 1, wherein points for each of the plurality of information elements are increased if a screen image occupancy rate is greater than a predetermined threshold.

10. The processing apparatus according to claim 1, wherein points for each of the plurality of information elements are increased if a gravity center position near a central region of a display is greater than a predetermined period of time.

11. A method for displaying information elements on a display, the method comprising:
calculating a user interest degree for each of a plurality of information elements,
wherein the user interest degree is an accumulated value of points for each of the plurality of information elements within a fixed period of time,
ranking the plurality of information elements using the calculated user interest degrees; and
producing image data in which the plurality of information elements are disposed in accordance with the respective ranks with reference to a predetermined position,
wherein the produced image data is displayed in a plurality of ranked hierarchal views for display on a display apparatus; and
on an initial screen image displayed first on the display apparatus, an information element in which the user interest degree is highest is displayed at a center or a corner of a screen image, and
on screen images displayed in a lower hierarchal view than the initial screen image, information elements are displayed in categorical groupings,
wherein the categorical groupings are chosen based upon predefined relationships between the information elements and the accumulated points for each of the displayed information elements.

12. A non-transitory computer-readable recording medium, in which a computer program is recorded, the computer program including:
calculating a user interest degree for each of a plurality of information elements,
wherein the user interest degree is an accumulated value of points for each of the plurality of information elements within a fixed period of time,
ranking the plurality of information elements using the calculated user interest degrees; and producing image data in which the plurality of information elements are disposed in accordance with the respective ranks with reference to a predetermined position, wherein the produced image data is displayed in a plurality of ranked hierarchal views for display on a display apparatus; and on an initial screen image displayed first on the display apparatus, an information element in which the user interest degree is highest is displayed at a center or a corner of a screen image, and on screen images displayed in a lower hierarchal view than the initial screen image, information elements are displayed in categorical groupings.

* * * * *